United States Patent
Qiu et al.

(10) Patent No.: US 11,797,220 B2
(45) Date of Patent: Oct. 24, 2023

(54) REDUCING MEMORY USAGE IN STORING METADATA

(71) Applicant: Cohesity, Inc., San Jose, CA (US)

(72) Inventors: Zhihuan Qiu, San Jose, CA (US); Sachin Jain, Fremont, CA (US); Anubhav Gupta, Sunnyvale, CA (US); Apurv Gupta, Bangalore (IN); Mohit Aron, Saratoga, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/408,007

(22) Filed: Aug. 20, 2021

(65) Prior Publication Data

US 2023/0059679 A1    Feb. 23, 2023

(51) Int. Cl.
*G06F 3/06*    (2006.01)

(52) U.S. Cl.
CPC .......... *G06F 3/0655* (2013.01); *G06F 3/0608* (2013.01); *G06F 3/0652* (2013.01); *G06F 3/0679* (2013.01)

(58) Field of Classification Search
CPC .... G06F 3/0608; G06F 3/0655; G06F 3/0652; G06F 3/0679; G06F 8/433; G06F 16/185; G06F 16/18; G06F 3/0623; G06F 2212/463; G06F 16/1858; G06F 16/908; G06F 16/188; G06F 16/1748; G06F 16/137; G06F 11/1448; G06F 3/0641; G06F 2201/84; G06F 16/182; G06F 11/1453; G06F 3/064
USPC .................................................. 711/154, 162
See application file for complete search history.

(56) References Cited

U.S. PATENT DOCUMENTS

| | | |
|---|---|---|
| 8,108,353 B2 | 1/2012 | Balachandran |
| 9,329,942 B2 | 5/2016 | Chavda |
| 10,706,014 B1 * | 7/2020 | Gupta ................... G06F 3/0604 |
| 10,754,731 B1 | 8/2020 | Arumugam |
| 11,474,673 B1 | 10/2022 | Abdul-Jawad |
| 2009/0271454 A1 | 10/2009 | Anglin |
| 2009/0300321 A1 | 12/2009 | Balachandran |
| 2009/0313248 A1 | 12/2009 | Balachandran |
| 2010/0161608 A1 | 6/2010 | Jain |
| 2010/0250501 A1 | 9/2010 | Mandagere |
| 2010/0333116 A1 | 12/2010 | Prahlad |
| 2011/0225130 A1 | 9/2011 | Tokoro |
| 2013/0018855 A1 | 1/2013 | Eshghi |

(Continued)

FOREIGN PATENT DOCUMENTS

WO    2018075042    4/2018

OTHER PUBLICATIONS

Fu et al., Design Tradeoffs for Data Deduplication Performance in Backup Workloads, 13th USENIX Conference on File and Storage Technologies (FAST '15), Feb. 2015, pp. 331-344.

(Continued)

*Primary Examiner* — Hashem Farrokh
(74) *Attorney, Agent, or Firm* — Van Pelt, Yi & James LLP

(57) ABSTRACT

Data is ingested from a source system including by storing a plurality of data chunks in one or more chunk files and storing corresponding chunk identifiers associated with the plurality of data chunks in a first data structure. After data ingestion is complete, one or more duplicate data chunks that were stored during the data ingestion are determined and a second data structure is updated to include one or more entries corresponding to one or more determined duplicate data chunks.

16 Claims, 21 Drawing Sheets

(56) References Cited

U.S. PATENT DOCUMENTS

| | | |
|---|---|---|
| 2013/0041872 A1 | 2/2013 | Aizman |
| 2013/0086006 A1 | 4/2013 | Colgrove |
| 2013/0097380 A1 | 4/2013 | Colgrove |
| 2013/0268496 A1 | 10/2013 | Baldwin |
| 2013/0282672 A1 | 10/2013 | Tashiro |
| 2014/0114932 A1 | 4/2014 | Mallaiah |
| 2015/0356109 A1 | 12/2015 | Arikawa |
| 2016/0026652 A1* | 1/2016 | Zheng .................. G06F 16/137 707/692 |
| 2017/0131934 A1 | 5/2017 | Kaczmarczyk |
| 2018/0329631 A1 | 11/2018 | Swift |
| 2019/0121673 A1 | 4/2019 | Gold |
| 2019/0130434 A1 | 5/2019 | Yoav |
| 2020/0081644 A1* | 3/2020 | Jeyaram .................. G06F 3/064 |
| 2020/0125450 A1 | 4/2020 | Aron |
| 2020/0272492 A1* | 8/2020 | Guturi ................. G06F 9/45558 |
| 2021/0109900 A1 | 4/2021 | Lachlan |
| 2021/0117441 A1 | 4/2021 | Patel |
| 2021/0303155 A1* | 9/2021 | Meister ............... G06F 11/2094 |
| 2021/0303519 A1 | 9/2021 | Periyagaram |
| 2021/0365296 A1 | 11/2021 | Shilane |

OTHER PUBLICATIONS

Kaplan et al., From Processing-in-Memory to Processing-in-Storage, Supercomputing Frontiers and Innovations, 2017, pp. 99-116, vol. 4, No. 3.

Li et al., Efficient Hybrid Inline and Out-of-Line Deduplication for Backup Storage, Oct. 12, 2018.

Ma et al., Lazy Exact Deduplication, 2017.

Vinod Mohan, Inline vs. Post-Process Deduplication and Compression, DataCore, Mar. 8, 2021, https://www.datacore.com/blog/inline-vs-post-process-deduplication-compression/.

Wang et al., I-sieve: An Inline High Performance Deduplication System Used in Cloud Storage, Tsinghua Science and Technology, Feb. 2015, pp. 17-27, vol. 20, No. 1.

Wu et al., HPDedup: A Hybrid Prioritized Data Deduplication Mechanism for Primary Storage in the Cloud, 2017.

* cited by examiner

400

| TreeID | NodeID | ChildrenID | BrickID | ChunkID | Chunk FileID |
|---|---|---|---|---|---|
| 1 | OR1 | OI1, OI2 | | | |
| 1 | OI1 | OL1, OL2, OL3, OL4 | | | |
| 1 | OI2 | OL5, OL6, OL7, OL8 | | | |
| 1 | OL1 | | Brick 1 | SHA-1$_a$ | |
| 1 | OL2 | | Brick 2 | SHA-1$_b$ | |
| 1 | OL3 | | Brick 3 | SHA-1$_c$ | |
| 1 | OL4 | | Brick 4 | SHA-1$_d$ | |
| 1 | OL5 | | Brick 5 | SHA-1$_e$ | |
| 1 | OL6 | | Brick 6 | SHA-1$_f$ | |
| 1 | OL7 | | Brick 7 | SHA-1$_g$ | |
| 1 | OL8 | | Brick 8 | SHA-1$_h$ | |
| 2 | OR2 | OI1, OI3 | | | |
| 2 | OI3 | OL5, OL6, OL7, OL9 | | | |
| 2 | OL9 | | Brick 9 | SHA-1$_i$ | |

| Chunk File ID | Chunk IDs | Post-Processing |
|---|---|---|
| 1 | SHA-1$_a$; SHA-1$_b$; SHA-1$_c$; SHA-1$_d$ | x |
| 2 | SHA-1$_e$; SHA-1$_f$; SHA-1$_g$; SHA-1$_h$ | x |
| 3 | SHA-1$_i$ | x |

| ChunkID | Chunk File ID |
|---|---|
| SHA-1$_a$ | 1 |
| SHA-1$_b$ | 1 |
| SHA-1$_c$ | 1 |
| SHA-1$_d$ | 1 |
| SHA-1$_e$ | 2 |
| SHA-1$_f$ | 2 |
| SHA-1$_g$ | 2 |

| ChunkID | Chunk File ID |
|---|---|
| SHA-1$_a$ | 1 |
| SHA-1$_b$ | 1 |
| SHA-1$_c$ | 1 |
| SHA-1$_d$ | 1 |
| SHA-1$_e$ | 2 |
| SHA-1$_f$ | 2 |
| SHA-1$_g$ | 2 |
| SHA-1$_h$ | 2 |
| SHA-1$_i$ | 3 |

| ChunkID | Chunk File ID |
|---|---|
| SHA-1$_a$ | 1 |
| SHA-1$_b$ | 1 |
| SHA-1$_c$ | 1 |
| SHA-1$_d$ | 1 |
| SHA-1$_e$ | 2 |
| SHA-1$_f$ | 2 |
| SHA-1$_g$ | 2 |

| Chunk File ID | Chunk IDs | Post-Processing |
|---|---|---|
| 1 | SHA-1$_a$; SHA-1$_b$; SHA-1$_c$; SHA-1$_d$ | |
| 2 | SHA-1$_e$; SHA-1$_f$; 8-byte A; SHA-1$_h$ | |
| 3 | 8-byte B | |

| TreeID | NodeID | ChildrenID | Brick ID | ChunkID | Chunk FileID |
|---|---|---|---|---|---|
| 1 | OR1 | OI1, OI2 | | | |
| 1 | OI1 | OL1, OL2, OL3, OL4 | | | |
| 1 | OI2 | OL5, OL6, OL7, OL8 | | | |
| 1 | OL1 | | Brick 1 | SHA-1$_a$ | |
| 1 | OL2 | | Brick 2 | SHA-1$_b$ | |
| 1 | OL3 | | Brick 3 | SHA-1$_c$ | |
| 1 | OL4 | | Brick 4 | SHA-1$_d$ | |
| 1 | OL5 | | Brick 5 | SHA-1$_e$ | |
| 1 | OL6 | | Brick 6 | SHA-1$_f$ | |
| 1 | OL7 | | Brick 7 | SHA-1$_g$ | |
| 1 | OL8 | | Brick 8 | 8-byte A | 2 |
| 2 | OR2 | OI1, OI3 | | | |
| 2 | OI3 | OL5, OL6, OL7, OL9 | | | |
| 2 | OL9 | | Brick 9 | 8-byte B | 3 |

FIG. 4G

REDUCING MEMORY USAGE IN STORING METADATA

BACKGROUND OF THE INVENTION

A storage system may perform a plurality of data management operations (e.g., backup, replication, object tiering, migration, archiving, etc.). Some of the data chunks associated with performing a data management operation may be a duplicate of other data chunks stored by the storage system when performing the data management operation. Some of the data chunks associated with performing a data management operation may be a duplicate of other data chunks included in one or more previously performed data management operations. The storage system may deduplicate the data chunks to improve storage utilization by removing duplicate instances of a data chunk and storing a single instance of the data chunk.

BRIEF DESCRIPTION OF THE DRAWINGS

Various embodiments of the invention are disclosed in the following detailed description and the accompanying drawings.

FIGS. 4A-4G are diagrams illustrating data structures in accordance with some embodiments.

DETAILED DESCRIPTION

Figure 1:
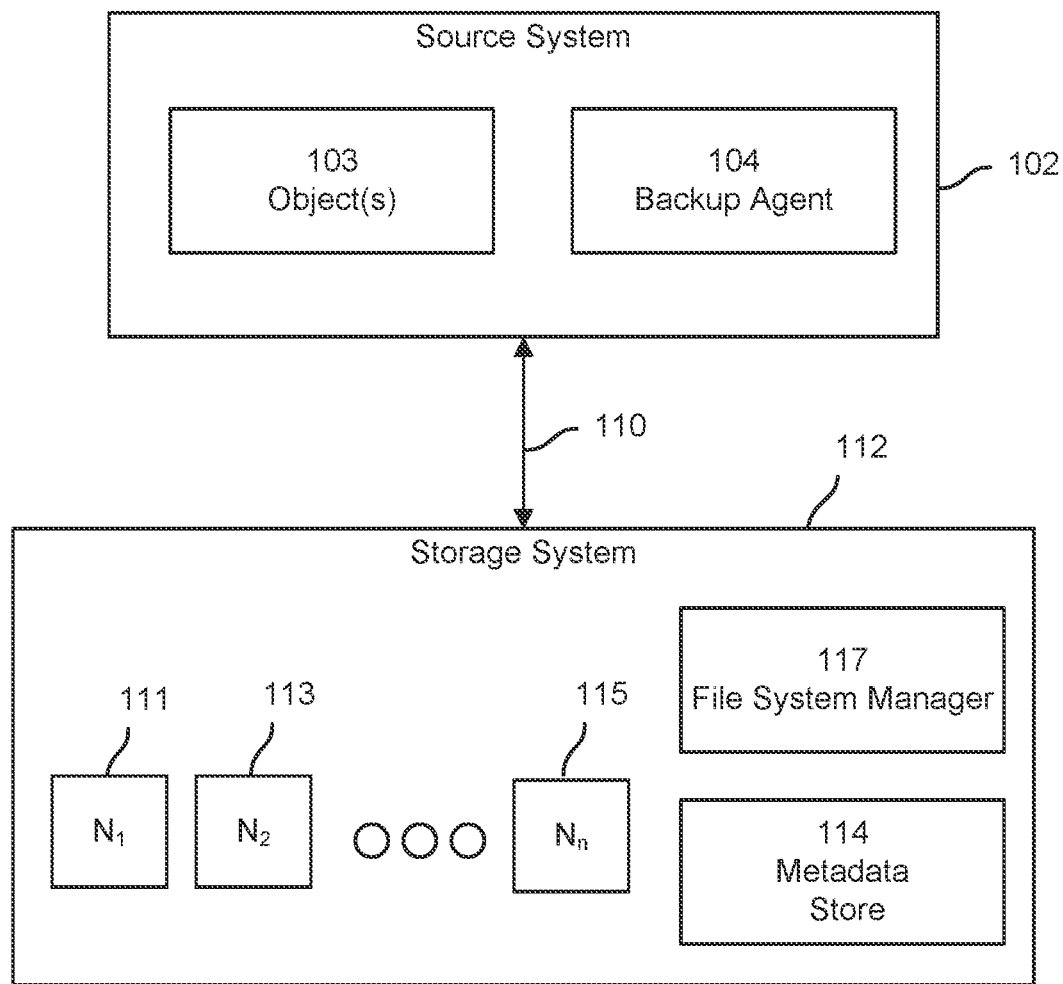
FIG. 1 is a block diagram illustrating a system for reducing the amount of memory used to store metadata in accordance with some embodiments.

A storage system performs a data management operation (e.g., backup, replication, tiering, migration, archiving, etc.) for a source system by ingesting data from the source system and storing the data as a plurality of data chunks in one or more chunk files that are stored in one or more storage devices associated with the storage system. In some embodiments, duplicate copies of data chunks may be included within the ingested data. In some embodiments, duplicate copies of the same data chunk may arise as a result of the operation of different types of data management operations (e.g., backup, replication, tiering, migration, archiving, etc.). The storage system may perform deduplication to remove the duplicate copies of data chunks.

A storage system may perform in-line deduplication while data is being ingested to prevent the storage system from storing duplicate copies of data chunks. The storage system maintains in a metadata store a chunk metadata data structure (e.g., a table) that indicates the data chunks that are already stored by the storage system. An entry of the chunk metadata data structure may associate a chunk identifier associated with a data chunk with an identifier of a corresponding storage location for the data chunk (e.g., a chunk file identifier of a chunk file storing the data chunk). A chunk identifier may be a cryptographic hash function value (e.g., SHA-1, SHA-2, etc.). Each chunk identifier included in the chunk metadata data structure may consume a particular amount of memory (e.g., 20 bytes).

The storage system is configured to write a batch of data chunks to a storage device. Prior to writing the batch of data chunks, the storage system determines whether any of the data chunks included in the batch are already stored by the storage system (either prior to performing the data management operation or from a previous batch included in a performance of the data management operation) by comparing a corresponding chunk identifier associated with each of the data chunks included in the batch to the plurality of chunk identifiers stored by the chunk metadata data structure.

In the event a data chunk included in the batch is already stored by the storage system, the storage system deletes the data chunk from memory (e.g., flash memory, random access memory, erasable programmable read only memory, solid state drive, etc.) and generates a tree data structure node that stores a reference to the already stored data chunk. In the event a data chunk included in the batch is not already stored by the storage system, the storage system writes the data chunk to a chunk file and updates the chunk metadata data structure to include an entry that associates the chunk identifier associated with the data chunk with a chunk file identifier associated with the chunk file storing the data chunk.

The chunk metadata data structure may include a single entry for each data chunk stored by the storage system. This may prevent the storage system from storing duplicate copies of data chunks when performing in-line deduplication while data is being ingested. However, after a threshold period of time (e.g., 2 months), the storage system may only store a single copy of a data chunk for a large number of data chunks. This may indicate that the storage system is unlikely to store an additional copy of the data chunk. The storage system may store the chunk metadata data structure in a memory of a hot storage tier (e.g., solid state drive ((SSD)) because when the storage system receives a request for an object, the storage system utilizes the chunk metadata data structure to quickly look_up a storage location for the data chunks associated with an object. The amount of memory in the hot storage tier is finite. Storing an entry for each data chunk stored by the storage system to prevent the storage system from storing duplicate copies of data chunks may unnecessarily waste memory resources when the storage system is likely to only store a single copy of the data chunk.

Techniques to reduce the amount of memory used to store metadata are disclosed herein. In some embodiments, the storage system ingests the data associated with performing a data management operation without performing in-line deduplication and after data has been ingested, performs a post-processing metadata conversion process using a first technique. In some embodiments, the storage system ingests data from a source system and chunks the ingested data into a plurality of data chunks. In some embodiments, the source system provides a plurality of data chunks to the storage system. The plurality of data chunks are variable sized data chunks.

For each of the data chunks, the storage system generates a corresponding chunk identifier (e.g., SHA-1 hash value), stores the data chunk in a corresponding chunk file, updates a chunk file metadata data structure to associate the corresponding chunk identifier with the corresponding chunk file, updates the chunk file metadata data structure to indicate that the corresponding chunk file needs to undergo a post-processing metadata conversion process, and generates a tree data structure node that stores a reference to the corresponding chunk file storing the data chunk.

In some embodiments, a source system chunks the data to be stored at the storage system into a plurality of data chunks, determines a corresponding chunk identifier for each of the plurality of data chunks, and sends the chunk identifiers and the data chunks to the storage system. For each of the data chunks, the storage system stores the data chunk in a corresponding chunk file, updates a chunk file metadata data structure to associate the corresponding chunk identifier with the corresponding chunk file, updates the chunk file metadata data structure to indicate that the corresponding chunk file needs to undergo a post-processing metadata conversion process, and generates a tree data structure node that stores a reference to the corresponding chunk file storing the data chunk.

The storage system maintains a chunk file metadata data structure that is comprised of a plurality of entries. An entry corresponds to a chunk file and associates a chunk file identifier associated with the chunk file with one or more chunk identifiers associated with one or more data chunks stored in the chunk file. This indicates the one or more data chunks having the one or more chunk identifiers that are stored in the chunk file.

After data ingestion is completed, the storage system performs a post-processing metadata conversion process because some of the data chunks stored during data ingestion since a previous post-processing metadata conversion process may be duplicates (e.g., duplicates within a performance of a data management operation and/or duplicates with respect to a previous performance of a data management operation). In some embodiments, the post-processing metadata conversion process is performed periodically (e.g., daily, weekly, monthly, etc.). In some embodiments, the post-processing metadata conversion process is performed when the storage system has resources to perform it as a background process. A post-processing metadata conversion process is performed by analyzing the chunk file metadata data structure to identify data chunks that may be duplicates. The storage system determines the entries that indicate a chunk file corresponding to the entry needs to undergo a post-processing metadata conversion process.

For the determined entries, the storage system selects an entry and determines whether a chunk identifier associated with the selected entry is the same chunk identifier associated with a threshold number of other entries of the chunk file metadata data structure (e.g., the chunk identifier is included in one or more other entries of the chunk file metadata data structure). In the event the chunk identifier associated with the selected entry is not the same chunk identifier associated with a threshold number of other entries of the chunk file metadata data structure, the storage system maintains the selected entry in the chunk file metadata data structure. In the event the chunk identifier associated with the entry is the same chunk identifier associated with a threshold number of other entries, then the storage system updates the chunk metadata data structure to include an entry for the data chunk associated with the selected entry, deletes the data chunk corresponding to the same chunk identifier from one or more chunk files corresponding to the one or more other entries, and updates the one or more other entries to un-reference the same chunk identifier. The storage system repeats the above process until all of the entries of the chunk file metadata data structure having metadata that indicates the chunk file corresponding to the entry needs to undergo a post-processing metadata conversion process have been analyzed. As a result, the chunk metadata data structure stores entries for deduplicated data chunks. This reduces the amount of memory used by the hot storage tier to store metadata because the chunk metadata data structure stores entries for deduplicated data chunks instead of storing entries for all data chunks. Advantageously, this deduplication step does not require the data to be read and/or rewritten.

The amount of memory used by the hot storage tier to store metadata may be further reduced for entries having chunk identifiers that are associated with fewer than a threshold number of other entries. For each of these entries, a chunk identifier associated with the entry is modified from a first chunk identifier to a second chunk identifier. For example, the first chunk identifier may be an SHA-1 hash value, which may be represented by a 20-byte value. The second chunk identifier may be an 8-byte value. The entry of the chunk file metadata data structure and a node of a tree data structure storing a reference to the chunk file associated with the entry are updated to reference the second chunk identifier instead of the first chunk identifier. This also reduces the amount of memory used by the hot storage tier to store metadata because the amount of memory used to store chunk identifiers associated with non-deduplicated data chunks is reduced. The amount of memory savings can be significant when the storage system stores fewer than a threshold number of copies of a data chunk for a large number of data chunks.

In some embodiments, the storage system performs in-line deduplication as discussed above. Using a second technique, the storage system performs a post-processing metadata conversion process to remove entries of the chunk metadata data structure that are associated with a single copy of a data chunk. In some embodiments, the post-processing metadata conversion process is performed periodically (e.g., daily, weekly, monthly, etc.). In some embodiments, the post-processing metadata conversion process is performed when the storage system has resources to perform it as a background process.

The storage system analyzes the chunk metadata data structure by selecting an entry corresponding to a chunk identifier. The storage system determines whether a data chunk corresponding to the chunk identifier associated with the selected entry is referenced by a threshold number of objects. In the event the data chunk corresponding to the chunk identifier associated with the selected entry is referenced by a threshold number of objects (e.g., two or more), the storage system maintains the selected entry in the chunk metadata data structure. In the event the data chunk corresponding to the chunk identifier associated with the selected entry is not referenced by a threshold number of objects, (e.g., the data chunk is referenced by a single object), then the storage system removes the entry from the chunk metadata data structure and updates a node of a tree data structure corresponding to the data chunk to store a reference to the corresponding chunk file storing the data chunk. The reference enables the storage system to locate the data chunk without having to utilize the chunk metadata data structure when the storage system receives a request for an object storing the data chunk. The storage system repeats the above process until all of the entries of the chunk metadata data structure have been analyzed. As a result, the chunk file metadata data structure only stores chunk identifiers for deduplicated data chunks stored by the storage system. This reduces the amount of memory used by the hot storage tier to store the chunk file metadata data structure by removing entries that correspond to data chunks that are not referenced by a threshold number of objects.

The amount of memory used by the hot storage tier to store metadata may be further reduced for chunk metadata data structure entries associated with data chunks that are not referenced by a threshold number of objects (e.g., the storage system stores a single copy of a data chunk). For each of these entries, a chunk identifier associated with a data chunk corresponding to an entry is modified from a first chunk identifier to a second chunk identifier where the second chunk identifier represents a data chunk in fewer bytes than the first chunk identifier. For example, the first chunk identifier may be an SHA-1 hash value, which is represented by a 20-byte value. The second chunk identifier may be an 8-byte value. An entry of the chunk file metadata data structure that stores the first chunk identifier and a node of a tree data structure storing a reference to the chunk file associated with the entry are updated to reference the second chunk identifier instead of the first chunk identifier. This reduces the amount of memory used by the hot storage tier to store the chunk file metadata data structure because the amount of memory used to store chunk identifiers associated with non-deduplicated data chunks is reduced. The amount of memory savings can be significant when the storage system stores a single copy of a data chunk for a large number of data chunks.

FIG. 1 is a block diagram illustrating a system for reducing the amount of memory used to store metadata in accordance with some embodiments. In the example shown, system 100 includes a source system 102 and a storage system 112. Source system 102 is coupled to storage system 112 via connection 110. Connection 110 may be a wired or wireless connection. Connection 110 may be a LAN, WAN, intranet, the Internet, and/or a combination thereof.

Source system 102 is a computing system that stores file system data. The file system data may include a plurality of files (e.g., content files, text files, object files, etc.) and metadata associated with the plurality of files. Source system 102 may be comprised of one or more servers, one or more computing devices, one or more storage devices, and/or a combination thereof. A backup of source system 102 may be performed according to one or more backup policies. In some embodiments, a backup policy indicates that file system data is to be backed up on a periodic basis (e.g., hourly, daily, weekly, monthly, etc.), when a threshold size of data has changed, or in response to a command from a user associated with source system 102.

Source system 102 may be configured to run one or more objects 103. Examples of objects include, but are not limited to, a virtual machine, a database, an application, a container, a pod, etc. Source system 102 may include one or more storage volumes (not shown) that are configured to store file system data associated with source system 102. The file system data associated with source system 102 includes the data associated with the one or more objects 103.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more objects 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 is comprised of a storage cluster that includes a plurality of storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. The plurality of storage devices may include one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

In some embodiments, a storage node of storage system 112 includes a processor, memory, and a storage device. The storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a storage system. A configuration of cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system.

Storage system 112 performs a data management operation (e.g., backup, replication, tiering, migration, archiving, etc.) for source system 102 by ingesting data from source system 102 and storing the data as a plurality of data chunks in one or more chunk files that are stored in one or more storage devices associated with one or more storage nodes 111, 113, 115 of storage system 112.

Storage system 112 includes a file system manager 117 that is configured to organize the file system data of the backup using a tree data structure. An example of the tree data structure is a snapshot tree, which may be based on a B+ tree structure (or other type of tree structure in other embodiments). Storage system 112 may store a plurality of tree data structures in metadata store 114, which is accessible by storage nodes 111, 113, 115. Storage system 112 may generate a snapshot tree and one or more metadata structures for each data management operation performance. Metadata store 114 may be stored in a memory of storage system 112. Metadata store 114 may be a distributed metadata store and stored in the memories of storage nodes 111, 113, 115.

In the event performing the data management operation corresponds to performing the data management operation with respect to all of the file system data of source system 102, a view corresponding to the data management operation performance may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event performing the data management operation corresponds to performing the data management operation with respect to all of the object data of one of the one or more objects 103 (e.g., a backup of a virtual machine), a view corresponding to the data management operation performance may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure.

A leaf node of a metadata structure may store metadata information, such as an identifier of a data brick associated with one or more data chunks and information associated with the one or more data chunks. In some embodiments, the information associated with the one or more data chunks includes corresponding object offsets and corresponding chunk identifiers associated with the one or more data chunks. In some embodiments, the information associated with the one or more data chunks also includes corresponding chunk file identifiers associated with one or more chunk files storing the data chunks. In some embodiments, the location of the one or more data chunks associated with a data brick is identified using a chunk metadata data structure and a chunk file metadata data structure stored in metadata store 114. In some embodiments, the location of the one or more data chunks associated with a data brick is identified using a chunk file metadata data structure stored in metadata store 114. The chunk file metadata data structure may include a plurality of entries where each entry associates a chunk identifier associated with a data chunk with a chunk file identifier of a chunk file storing the data chunk, an offset, and a size.

In some embodiments, for data chunks having an entry in the chunk metadata data structure, the location of a data chunk may be determined by traversing a tree data structure to a leaf node and determining a chunk identifier associated with the data chunk. The chunk metadata data structure may be used to determine a chunk file identifier of a chunk file storing the data chunk. The chunk file metadata data structure may be used to determine a location of the data chunk within the chunk file corresponding to the determined chunk file identifier.

In some embodiments, the storage system performs a post-processing metadata conversion process and removes an entry from the chunk metadata data structure. A leaf node of a tree data structure corresponding to a data chunk associated with the entry is updated to include a chunk file identifier of a chunk file storing the data chunk. The location of the data chunk corresponding to the removed entry may be determined by traversing a tree data structure to a leaf node and determining a chunk file identifier associated with the data chunk corresponding to the removed entry. The chunk file metadata data structure may be used to determine a location of the data chunk corresponding to the removed entry within the chunk file based on the determined chunk file identifier. This reduces the amount of time needed to locate the data chunk because the storage system does not need to locate the data chunk using the chunk metadata data structure.

Figure 2A:
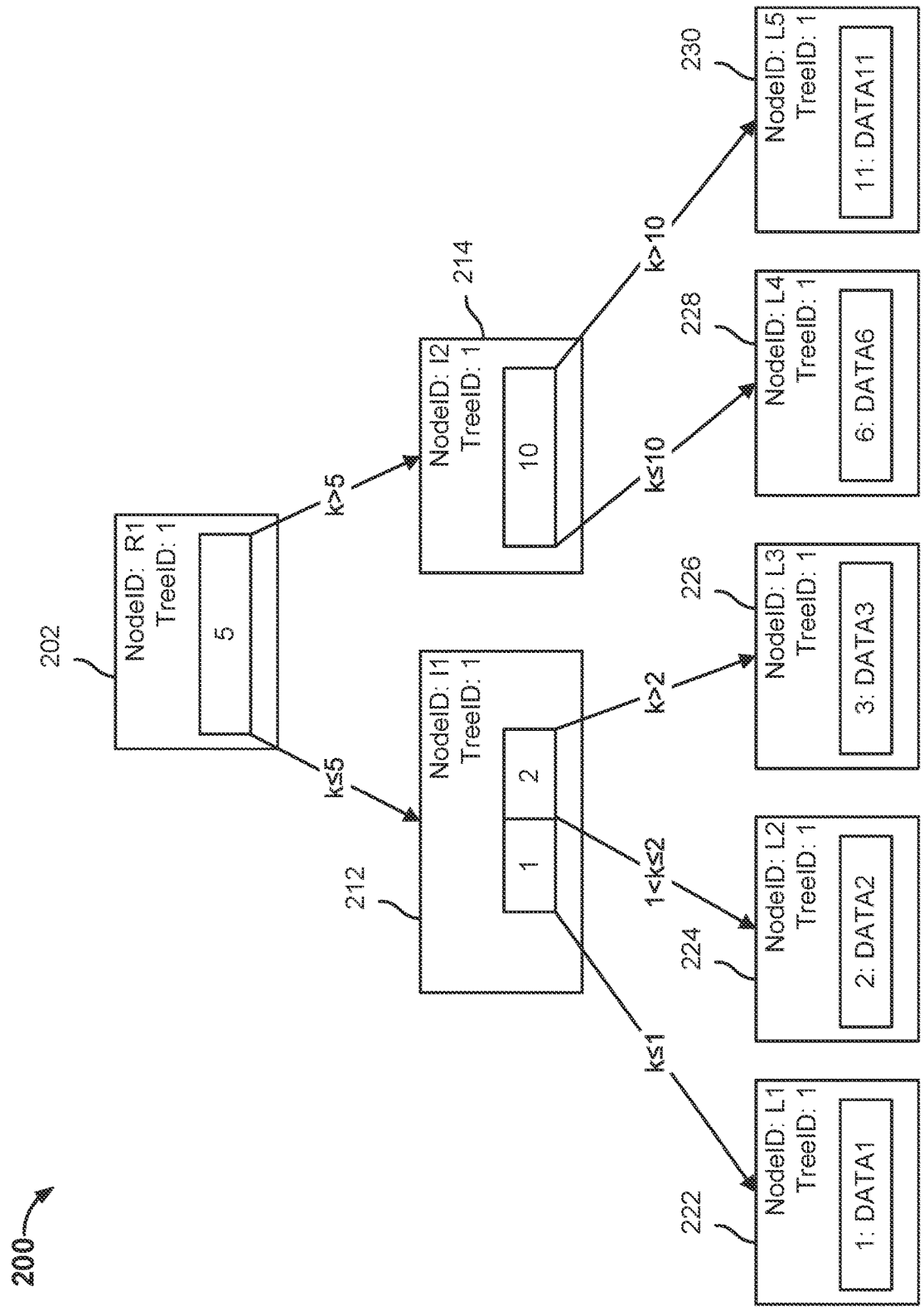
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as storage system 112. The file system data may include metadata for a distributed file system and may include information, such as chunk identifier, chunk offset, file size, directory structure, file permissions, physical storage locations of the content files, etc. A file system manager, such as file system manager 117, may generate tree data structure 200 in response to ingesting data from a source system. Tree data structure 200 may correspond to a full backup of a source system. Tree data structure 200 may correspond to a replica of the file system data stored on the source system. Tree data structure 200 may correspond to some or all of the file system data stored on the source system that is tiered to the storage system.

Tree data structure 200 is comprised of a snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a performance of a data management operation at a particular point in time, for example, at time to. The snapshot tree in conjunction with a plurality of metadata structures may provide a complete view of the source system associated with performing the data management operation for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with a content file when the data is less than or equal to a limit size (e.g., 256 kB). In some embodiments, a leaf node includes a pointer to a metadata structure (e.g., blob structure) when the size of data associated with a content file, object, or object file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than or equal to the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 214 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf nodes 222, 224, 226, 228, 230 include respective data key-value pairs of "1: DATA1," "2: DATA2," "3: DATA3," "6: DATA6," "11: DATA11." Leaf nodes 222, 224, 226, 228, 230 include respective Node IDs of "L1," "L2," "L3," "L4," "L5." Leaf nodes 222, 224, 226, 228, 230 all include a TreeID of "1." In some embodiments, leaf nodes 222, 224, 226, 228, or 230 are configured to store metadata. In other embodiments, leaf nodes 222, 224, 226, 228, or 230 are configured to store content data when the size of the content file is less than or equal to a limit size. In other embodiments, leaf nodes 222, 224, 226, 228, or 230 are inodes and are configured to store a pointer to or an identifier of a respective object metadata structure (e.g., object metadata tree).

Figure 2B:
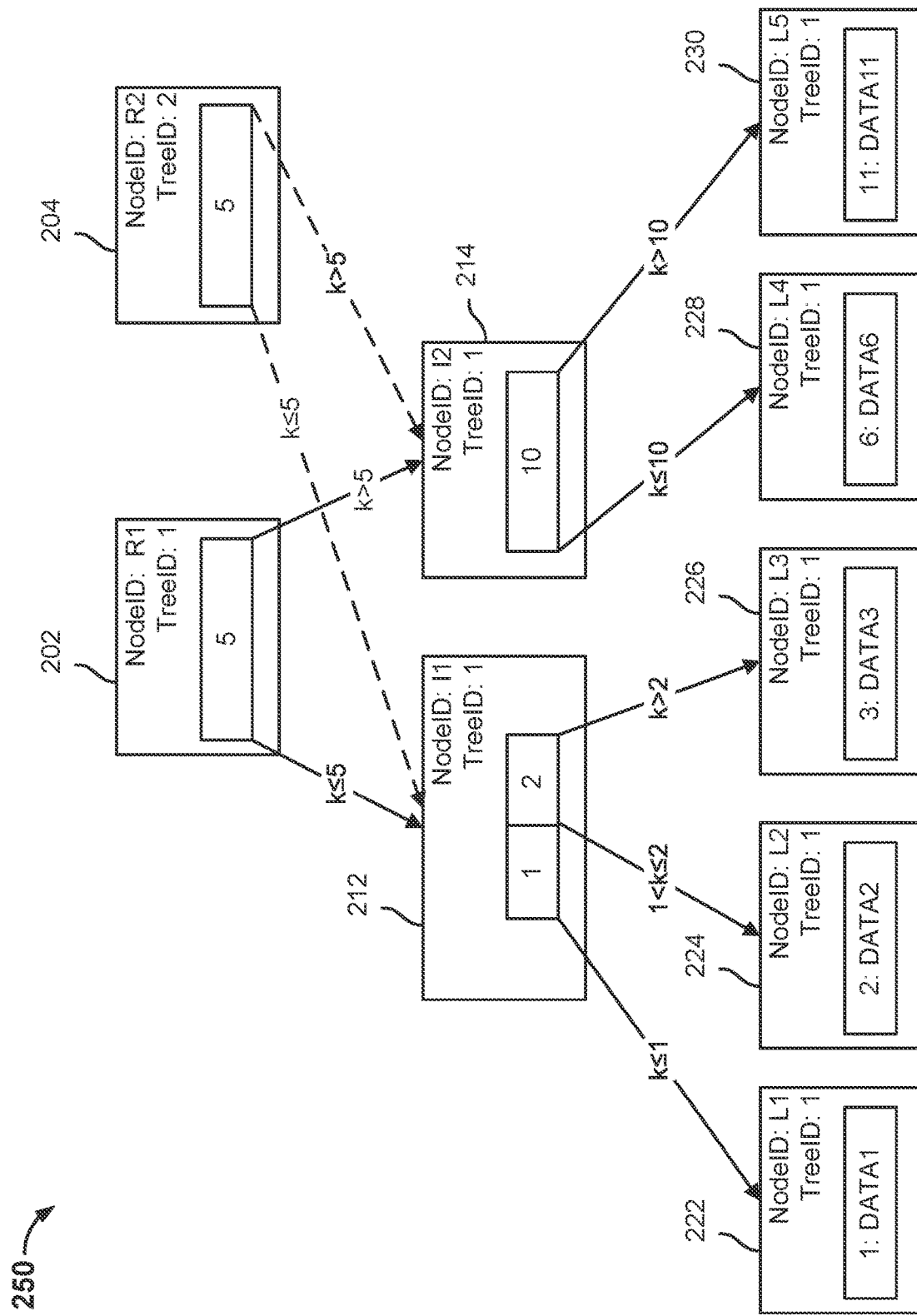
FIG. 2B is a block diagram illustrating an embodiment of a cloned tree data structure.

FIG. 2B is a block diagram illustrating an embodiment of a cloned tree data structure. A snapshot tree may be cloned when a snapshot tree is added to a tree data structure, when data associated with a snapshot tree is migrated, when data associated with a snapshot tree is restored, when data associated with a snapshot tree is replicated, when data associated with a snapshot tree is used for test/development purposes, etc. In some embodiments, tree data structure 250 may be created by a storage system, such as storage system 112.

A subsequent data management operation may be performed. For example, an incremental backup of a source system, such as source system 102, may be performed. The manner in which the file system data is associated with the subsequent data management operation may be represented by a tree data structure. The tree data structure corresponding to the subsequent data management operation is generated in part by cloning a snapshot tree associated with a performance of a previous data management operation.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure. In some embodiments, the tree data structure allows a chain of data management operation performances to be linked together by allowing a node of a later version of a snapshot tree to reference a node of a previous version of a snapshot tree. For example, a snapshot tree with root node 204 is linked to a snapshot tree with root node 202. Each time a data management operation is performed, a new root node may be created and the new root node includes the same set of pointers included in the previous root node, that is the new root node of the snapshot tree may be linked to one or more intermediate nodes associated with a previous snapshot tree. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a snapshot tree corresponding to a subsequent performance of a data management operation instance at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
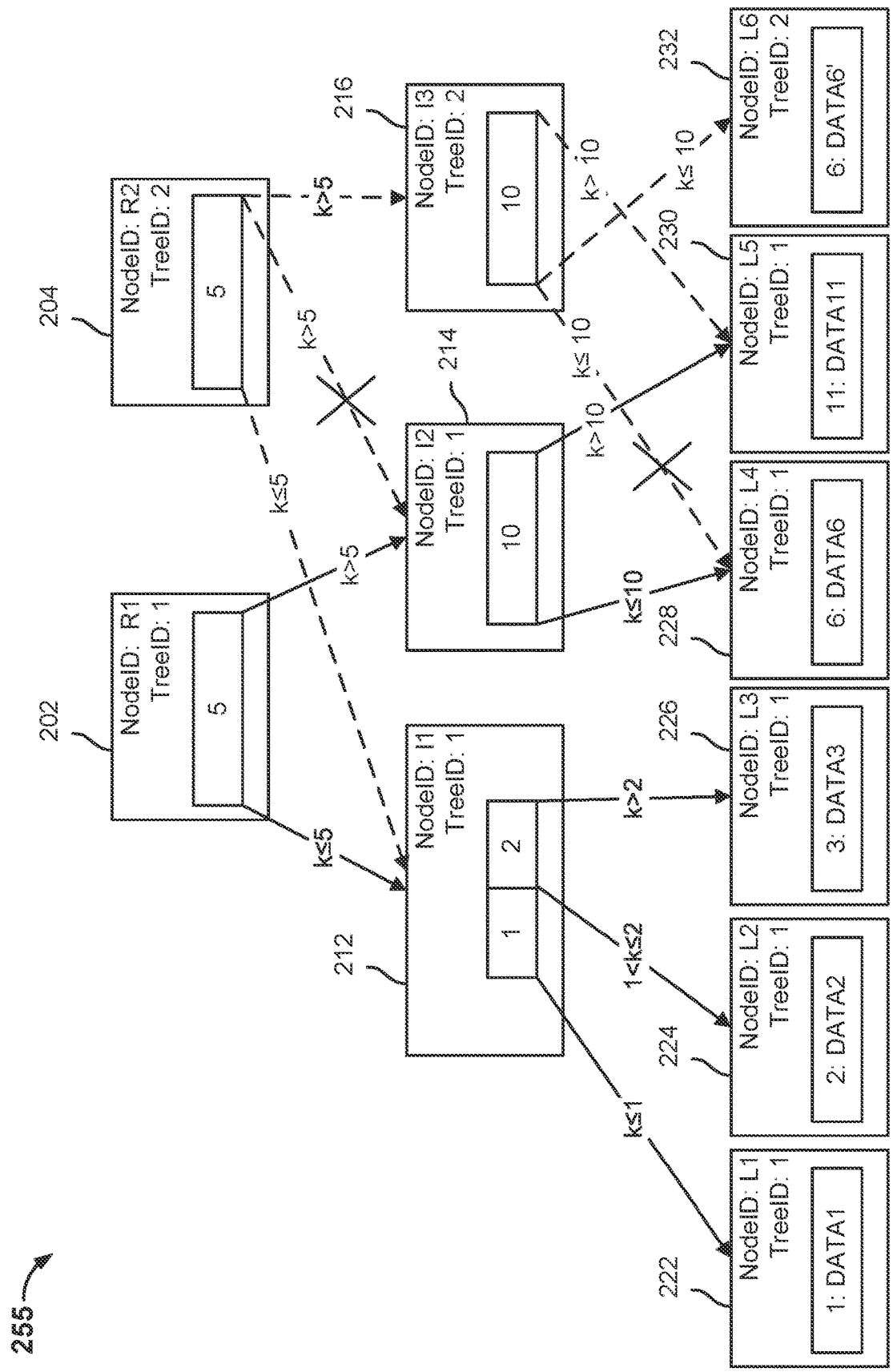
FIG. 2C is a block diagram illustrating an embodiment of modifying a cloned tree data structure.

FIG. 2C is a block diagram illustrating an embodiment of modifying a cloned tree data structure. In the example shown, tree data structure 255 may be modified by a file system manager, such as file system manager 117. A snapshot tree with a root node 204 may be a current view of the file system data, for example, at time $t_1$.

In the example shown, the value "DATA6" has been modified to be "DAT A6'." In some embodiments, the value of a key value pair has been modified. In other embodiments, the value of the key value pair is the file data of associated with a content file that is smaller than or equal to a limit size. In other embodiments, the value of the key value pair points to a different metadata structure (e.g., a metadata structure corresponding to a different version of a file). The different metadata structure may be a modified version of the metadata structure to which the leaf node previously pointed.

To modify the snapshot tree at $t_1$, the file system manager starts at root node 204 because that is the root node associated with the snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a content file that is smaller than or equal to a limit size.

Figure 2D:
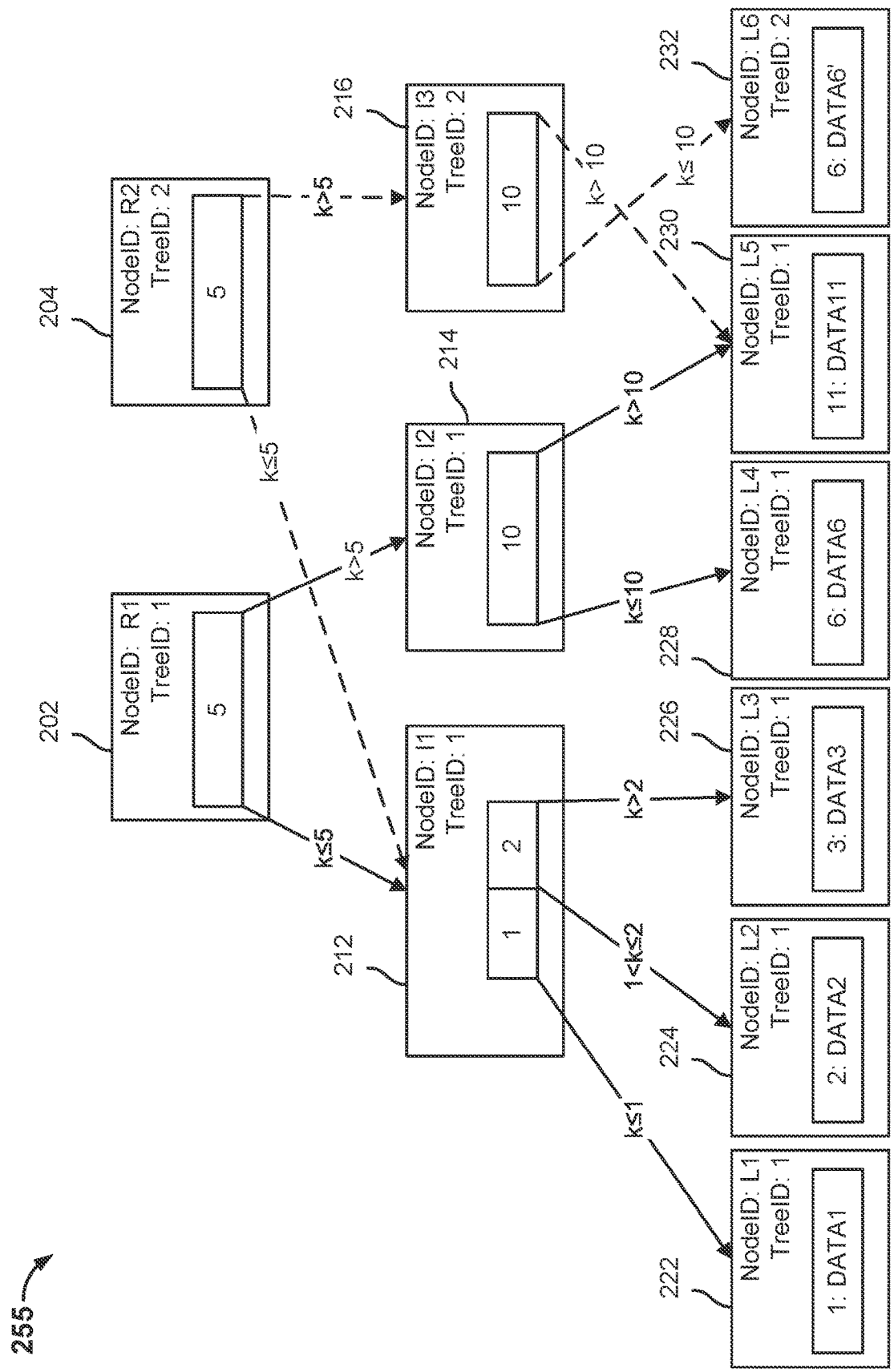
FIG. 2D is a block diagram illustrating an embodiment of a modified tree data structure.

FIG. 2D is a block diagram illustrating an embodiment of a modified tree data structure. Tree data structure 255 shown in FIG. 2D illustrates a result of the modifications made to a snapshot tree as described with respect to FIG. 2C.

Figure 3A:
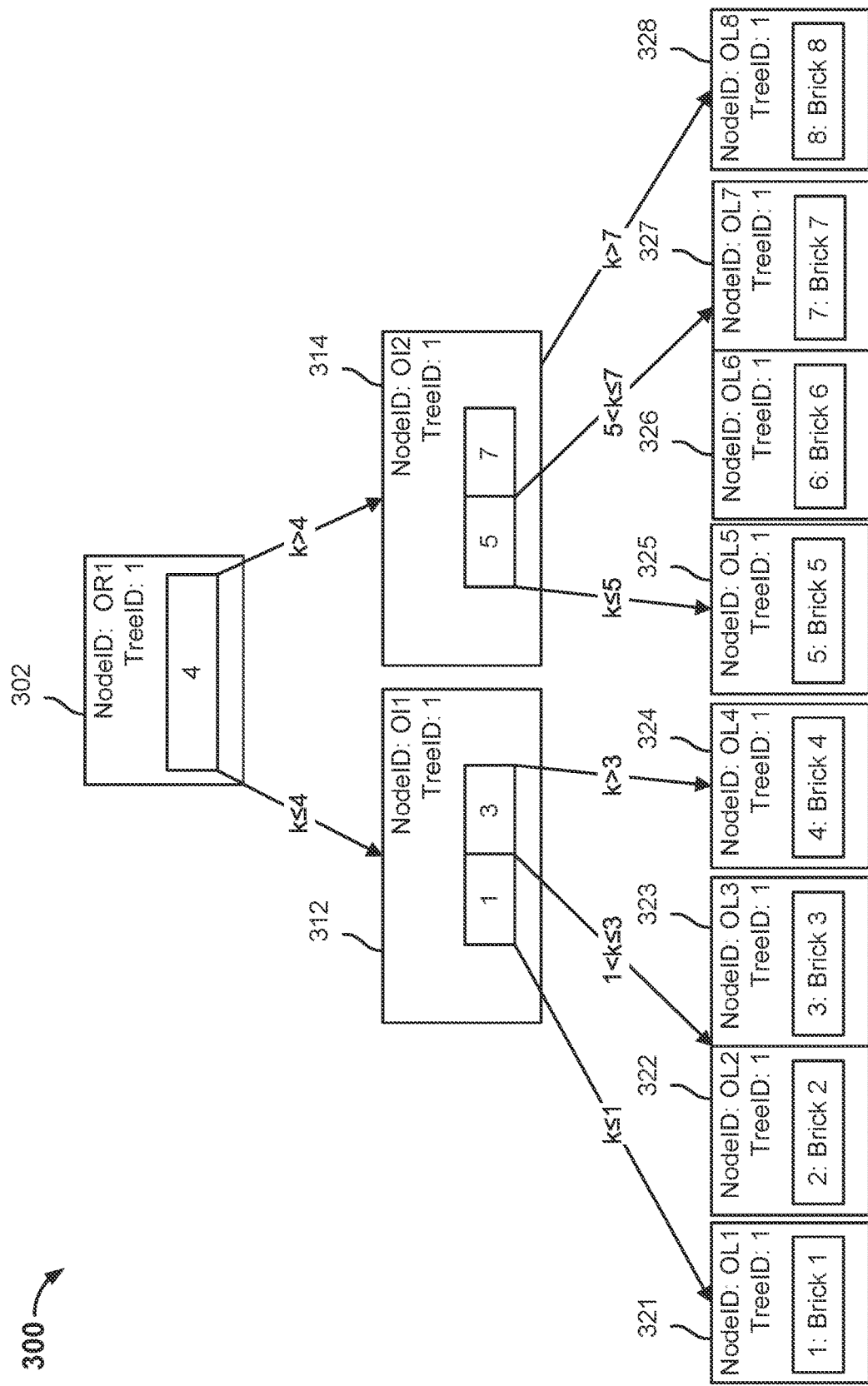
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. Tree data structure 300 may be used to store the metadata associated with an object, an object file, or a content file. Tree data structure 300 may be referred to as a metadata structure, an object file metadata structure, or a file metadata structure. In the example shown, tree data structure 300 corresponds to the contents of an object file.

A leaf node of a snapshot tree associated with file system data, such as a leaf node of tree data structures 200, 250, 255, may include a pointer to a tree data structure that stores metadata corresponding to an object file, such as tree data structure 300. A tree data structure corresponding to an object file and storing the file metadata associated with the object file is a snapshot tree, but is used to organize the data chunks associated with the object file (e.g., data components) that are stored on the storage system.

A tree data structure corresponding to an object file at a particular point in time (e.g., a particular version) may be comprised of a root node, one or more levels of one or more intermediate nodes, and one or more leaf nodes. In some embodiments, a tree data structure corresponding to an object file is comprised of a root node and one or more leaf nodes without any intermediate nodes. Tree data structure 300 may be a snapshot of an object file at a particular point in time t, for example at time to. Tree data structure 300 may correspond to a full backup of the object file.

In the example shown, tree data structure 300 includes object root node 302, object intermediate nodes 312, 314, and object leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the content file). Root node 302 includes pointers to intermediate nodes 312, 314. Root node 302 includes a NodeID of "OR1" and a TreeID of "1."

In the example shown, intermediate node 312 includes respective pointers to leaf nodes 321, 322, 323, 324. Intermediate node 312 includes a NodeID of "OI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "OI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a content file corresponding to tree data structure 300. Leaf node 321 includes a NodeID of "OL1" and a TreeID of "1."

Leaf node 322 includes a data key-value pair of "2: Brick 2." "Brick 2" is a brick identifier that identifies the data brick associated with one or more data chunks of a content file corresponding to tree data structure 300. Leaf node 322 includes a NodeID of "OL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of an object file corresponding to tree data structure 300. Leaf node 323 includes a NodeID of "OL3" and a TreeID of "1."

Leaf node 324 includes a data key-value pair of "4: Brick 4." "Brick 4" is a brick identifier that identifies the data brick associated with one or more data chunks of an object file corresponding to tree data structure 300. Leaf node 324 includes a NodeID of "OL4" and a TreeID of "1."

Leaf node 325 includes a data key-value pair of "5: Brick 5." "Brick 5" is a brick identifier that identifies the data brick associated with one or more data chunks of an object file corresponding to tree data structure 300. Leaf node 325 includes a NodeID of "OL5" and a TreeID of "1."

Leaf node 326 includes a data key-value pair of "6: Brick 6." "Brick 6" is a brick identifier that identifies the data brick associated with one or more data chunks of an object file corresponding to tree data structure 300. Leaf node 326 includes a NodeID of "OL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a content file corresponding to tree data structure 300. Leaf node 327 includes a NodeID of "OL7" and a TreeID of "1."

Leaf node 328 includes a data key-value pair of "8: Brick 8." "Brick 8" is a brick identifier that identifies the data brick associated with one or more data chunks of a content file corresponding to tree data structure 300. Leaf node 328 includes a NodeID of "OL8" and a TreeID of "1."

An object file may be comprised of one or more chunk files. A chunk file is comprised of a plurality of data chunks. A brick may be associated with one or more data chunks. In the example shown, leaf nodes 321, 322, 323, 324, 325, 326, 327, 328 each store a corresponding brick identifier. For each of the one or more data chunks associated with a data brick, the data brick stores information that associates an object offset for the data chunk with an extent for the data chunk and a chunk file identifier storing the data chunk.

Figure 3B:
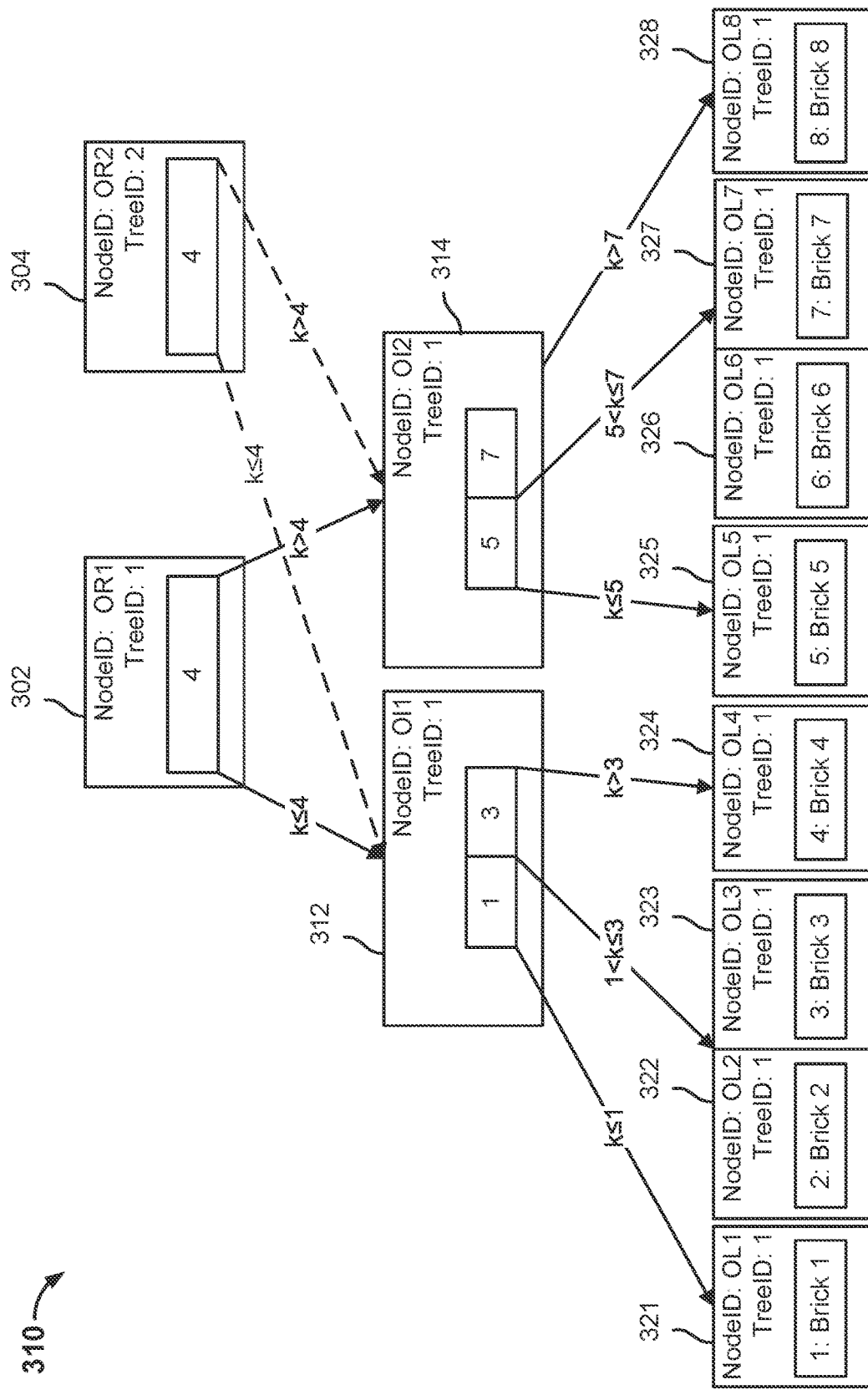
FIG. 3B is a block diagram illustrating an embodiment of a cloned tree data structure.

FIG. 3B is a block diagram illustrating an embodiment of a cloned tree data structure. A metadata structure may be cloned when a subsequent version of an object, an object file, or a content file is stored on a storage system. In some embodiments, tree data structure 310 may be created by a storage system, such as storage system 112. In the example shown, tree data structure 310 corresponds to an object file, but stores metadata associated with the object file. The tree data structure can be used to capture different versions of an object, an object file, or a content file at different moments in time. The metadata structure corresponding to a subsequent version of an object, an object file, or a content file may be generated in part by cloning the metadata structure corresponding to a previous version of an object, an object file, or a content file.

A root node or an intermediate node of a version of a metadata structure may reference an intermediate node or a leaf node of a previous version of a metadata structure. Similar to the snapshot tree, the metadata structure allows different versions of an object, an object file, or a content file to share nodes and allows changes to be tracked. When a backup snapshot is received, a root node of the metadata structure may be linked to one or more intermediate nodes associated with a previous metadata structure. This may occur when data associated with an object, an object file, or a content file is included in performances of multiple data management operations.

In the example shown, tree data structure 310 includes a first metadata structure comprising root node 302, intermediate nodes 312, 314, and leaf nodes 321, 322, 323, 324, 325, 326, 327, 328. Tree data structure 310 also includes a second metadata structure that may be a snapshot of object data at a particular point in time, for example at time $t_1$. The second metadata structure is comprised of root node 304, intermediate nodes 312, 314, and leaf nodes 321, 322, 323, 324, 325, 326, 327, 328. To create a snapshot of the object data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the metadata structure at a particular moment in time. The TreeID of a root node indicates a view with which the root node is associated (e.g., content file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a metadata structure included in tree data structure 310 from root node 304 to intermediate node 314 leads to a leaf node with a data key of "5," "6," "7," or "8." Root node 304 includes a NodeID of "OR2" and a TreeID of "2."

Figure 3C:
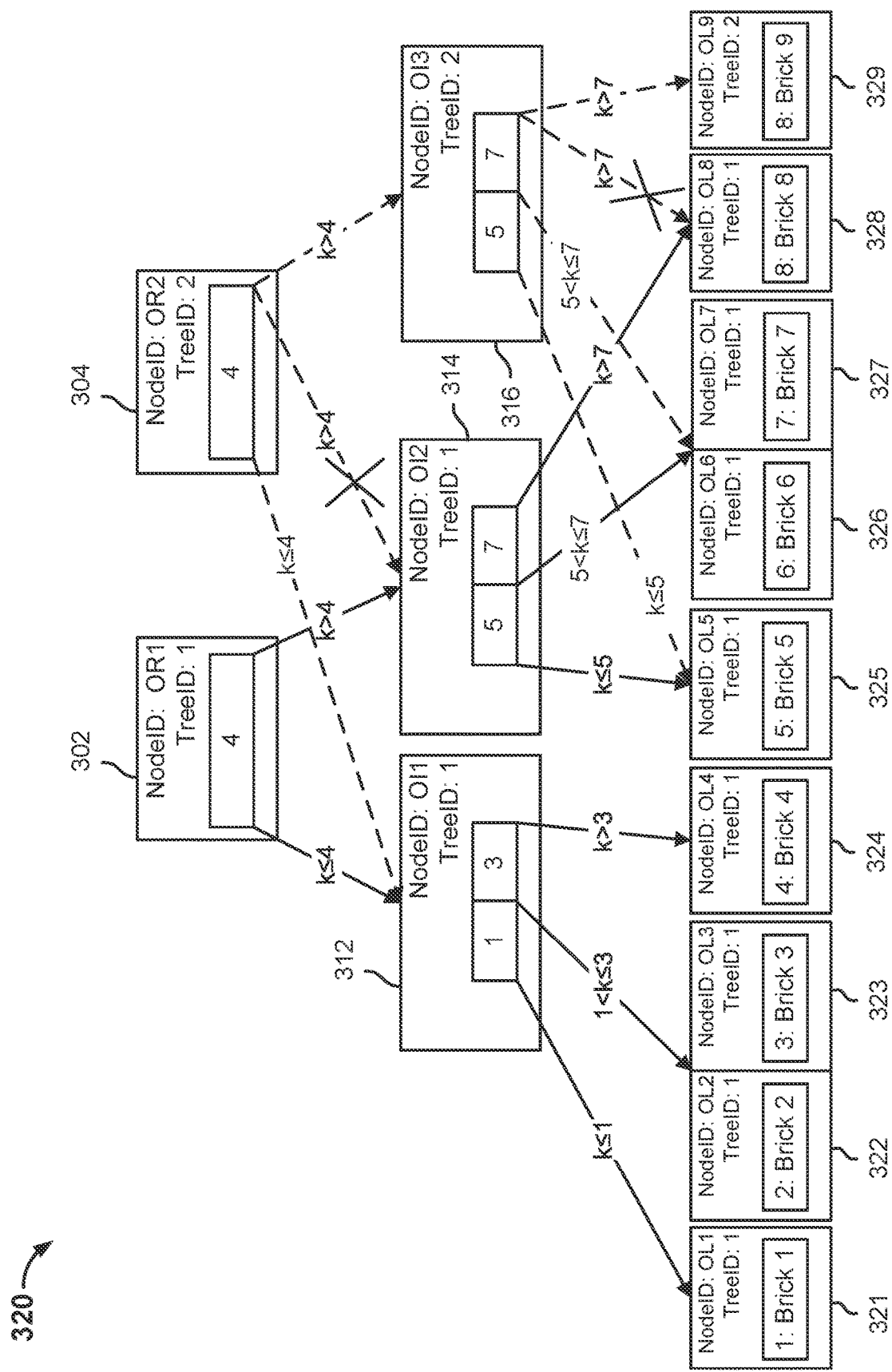
FIG. 3C is a block diagram illustrating an embodiment of modifying a cloned tree data structure.

FIG. 3C is a block diagram illustrating an embodiment of modifying a cloned tree data structure. Tree data structure 320 is comprised of a first metadata structure that includes root node 302 and a second metadata structure that includes root node 304. In the example shown, tree data structure 320 may be modified by a file system manager, such as file system manager 117.

In some embodiments, the content data associated with an object file may be modified such that one of the data chunks is replaced by another data chunk. When a data chunk of content data associated with a previous backup snapshot is replaced with a new data chunk, the data brick associated with the new data chunk may be different. To represent this modification to the object data, a corresponding modification is made to a current view of a metadata structure. The data chunk of the content data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk. In the example shown, a data chunk associated with "Brick 8" has been modified. The data chunk associated with "Brick 8" has been replaced with a data chunk associated with "Brick 9." At $t_1$, the file system manager starts at root node 304 because that is the root node associated with the metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 9" and includes the same TreeID as root node 304. The file system manager updates a pointer of intermediate node 316 to point to leaf node 329 instead of pointing to leaf node 328.

Figure 3D:
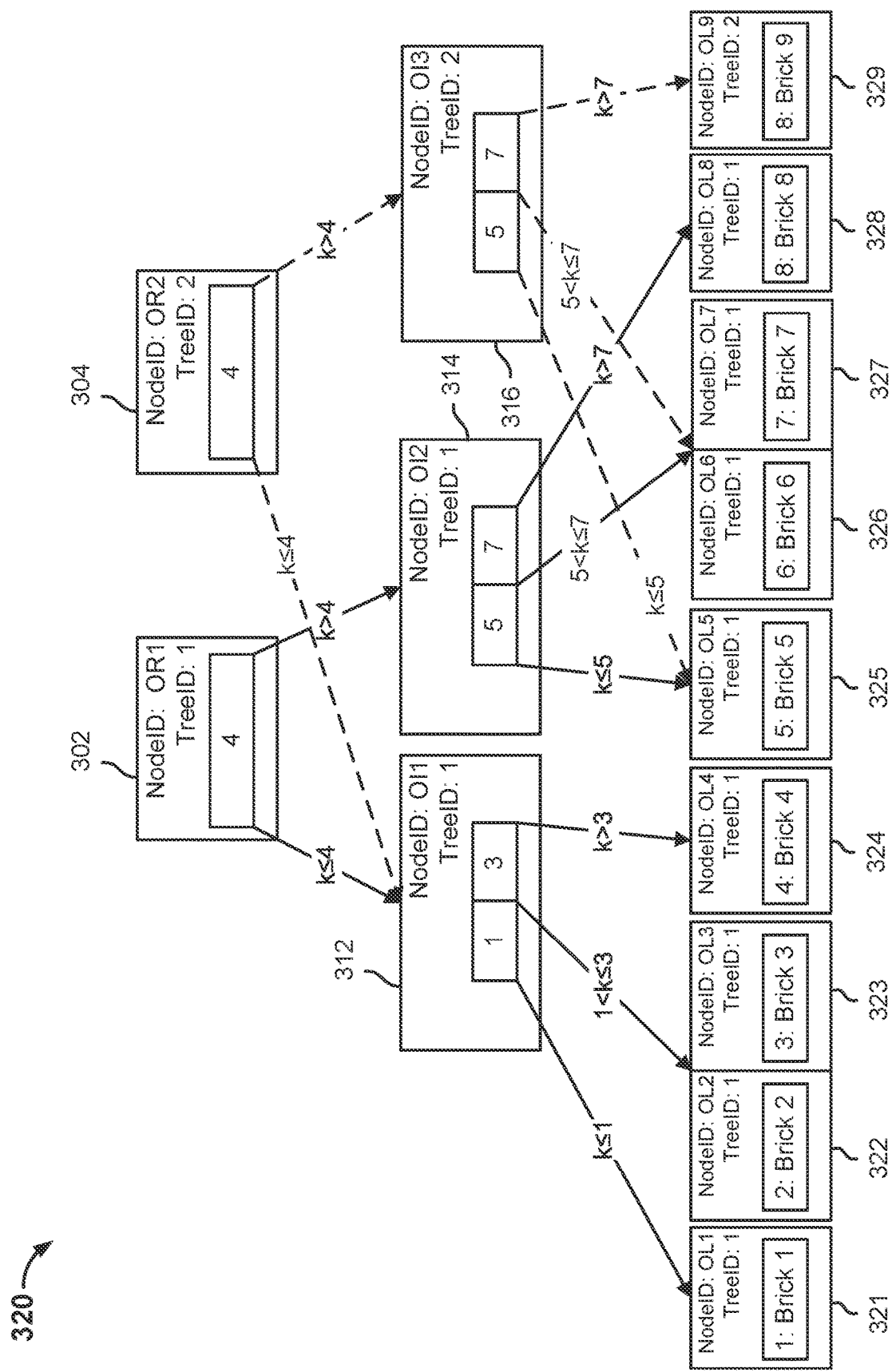
FIG. 3D is a block diagram illustrating an embodiment of a modified tree data structure.

FIG. 3D is a block diagram illustrating an embodiment of a modified tree data structure. The tree data structure 320 shown in FIG. 3D illustrates a result of the modifications made to tree data structure 320 as described with respect to FIG. 3C.

FIG. 4A is a diagram illustrating a data structure in accordance with some embodiments. Data structure 400 may be stored by a storage system, such as storage system 112, in a metadata store, such as metadata store 114. Data structure 400 may correspond to a tree data structure. In the example shown, data structure 400 stores the information associated with tree data structure 320. For example, data structure 400 stores information about a node, such as "TreeID," "NodeID," "ChildrenID," "BrickID," "ChunkID," and "Chunk FileID." Data structure 400 may store other information (not shown), such as an offset for a data chunk, a size for a data chunk, and/or a checksum.

The "TreeID" value identifies a view of data to which the node is originally associated. For example, a view of data may be generated by a storage system. A "TreeID" of "1" indicates that a node was generated when the storage system generated a view of data associated with a "TreeID" of "1." The "NodeID" value identifies a name of a node. The "ChildrenID" value identifies the one or more children nodes to which the node points. The "BrickID" value is a brick identifier stored by a node. The "ChunkID" value is a chunk identifier associated with a data chunk associated with the brick identifier. The "Chunk FileID" value is a chunk file identifier associated with a chunk file storing a data chunk associated with the brick identifier.

In some embodiments, the storage system stores a version of data structure 400 for each view generated by the storage system. In some embodiments, data structure 400 stores information for all of the views generated by the storage system. A storage system may traverse data structure 400 to determine the number of objects that reference a data chunk associated with a leaf node. For example, data structure 400 may be traversed to determine that the one or more data chunks associated with a data brick having a brick identifier of "Brick 1" is referenced by two objects, the one or more data chunks associated with a data brick having a brick identifier of "Brick 2" is referenced by two objects, the one or more data chunks associated with a data brick having a brick identifier of "Brick 3" is referenced by two objects, the one or more data chunks associated with a data brick having a brick identifier of "Brick 4" is referenced by two objects, the one or more data chunks associated with a data brick having a brick identifier of "Brick 5" is referenced by two objects, the one or more data chunks associated with a data brick having a brick identifier of "Brick 6" is referenced by two objects, the one or more data chunks associated with a data brick having a brick identifier of "Brick 7" is referenced by two objects, the one or more data chunks associated with a data brick having a brick identifier of "Brick 8" is referenced by one object, and the one or more data chunks associated with a data brick having a brick identifier of "Brick 9" is referenced by one object.

FIG. 4B is a diagram illustrating a data structure in accordance with some embodiments. Data structure 410 may be stored by a storage system, such as storage system 112, in a metadata store, such as metadata store 114. In some embodiments, data structure 410 corresponds to a chunk file metadata data structure.

A storage system may ingest data associated with performing a data management operation without performing in-line deduplication. Each of the data chunks included in the ingested data is associated with a corresponding chunk identifier (e.g., SHA-1 hash value). The storage system stores the data chunk in a corresponding chunk file, and updates a chunk file metadata data structure, such as data structure 410, to associate the corresponding chunk identifier with the corresponding chunk file and to indicate that the corresponding chunk file needs to undergo a post-processing metadata conversion process.

In the example shown, when performing a first data management operation, the storage system wrote the data chunks associated with chunk identifiers "SHA-$1_a$," "SHA-$1_b$," "SHA-$1_c$," and "SHA-$1_d$" to a chunk file having a chunk file identifier of "1" and wrote the data chunks associated with chunk identifiers "SHA-$1_e$", "SHA-$1_f$", "SHA-$1_g$", and "SHA-$1_h$" to a chunk file having a chunk file identifier of "2". When performing a second data management operation, the storage system wrote the data chunk associated with the chunk identifier "SHA-$1_i$" to a chunk file having a chunk file identifier of "3".

During data ingestion, the storage system updated data structure 410 to indicate the chunk files having chunk file identifiers of "1", "2", and "3" need to undergo post-processing.

FIG. 4C is a diagram illustrating a data structure in accordance with some embodiments. Data structure 420 may be stored by a storage system, such as storage system 112, in a metadata store, such as metadata store 114. In some embodiments, data structure 420 corresponds to a chunk metadata data structure. In the example shown, data structure 420 is configured to associate a chunk identifier associated with a data chunk with a chunk file identifier associated a chunk file storing the data chunk.

After data ingestion is completed, the storage system performs a post-processing metadata conversion process because some of the data chunks written during data ingestion to the one or more storage devices associated with the storage system may be duplicates. A post-processing metadata conversion process is performed by analyzing the chunk file metadata data structure (e.g., data structure 410) to identify data chunks that may be duplicates. The storage system determines the entries that indicate a chunk file corresponding to the entry needs to undergo a post-processing metadata conversion process.

The storage system updates a chunk metadata data structure, such as data structure 420, to include entries for data chunks that were deduplicated.

In this example, the storage system stores a plurality of chunk files that are not depicted in data structure 410. When performing the post-processing metadata conversion process, the storage system determined that it stored duplicate copies of the data chunks associated with chunk identifiers of "SHA-$1_a$," "SHA-$1_b$," "SHA-$1_c$", "SHA-$1_d$", "SHA-$1_e$", "SHA-$1_f$", and "SHA-$1_g$" and updated data structure 420 to include entries for each of these chunk identifiers. The storage system determined that it did not store duplicate copies of the data chunks associated with chunk identifiers of "SHA-$1_h$" and "SHA-$1_i$," and did not update data structure 420 to include entries for these chunk identifiers. As a result, the amount of memory needed to store a chunk metadata data structure is reduced because the chunk metadata data structure does not need to store entries for every data chunk stored by the storage system.

FIG. 4D is a diagram illustrating a data structure in accordance with some embodiments. Data structure 430 may be stored by a storage system, such as storage system 112, in a metadata store, such as metadata store 114. In some embodiments, data structure 430 corresponds to a chunk metadata data structure.

A storage system may perform in-line deduplication while data is being ingested. Data structure 430 is updated to include an entry when the storage system stores a data chunk that was not previously stored by the storage system.

In the example shown, the storage system has updated data structure 430 to include an entry that associates a chunk identifier of "SHA-$1_a$" with a chunk file having a chunk file identifier of "1", an entry that associates a chunk identifier of "SHA-$1_b$" with a chunk file having a chunk file identifier of "1", an entry that associates a chunk identifier of "SHA-1c" with a chunk file having a chunk file identifier of "1", an entry that associates a chunk identifier of "SHA-$1_d$" with a chunk file having a chunk file identifier of "1", an entry that associates a chunk identifier of "SHA-$1_e$" with a chunk file having a chunk file identifier of "2", an entry that associates a chunk identifier of "SHA-$1_f$" with a chunk file having a chunk file identifier of "2", an entry that associates a chunk identifier of "SHA-$1_g$" with a chunk file having a chunk file identifier of "2", an entry that associates a chunk identifier of "SHA-$1_h$" with a chunk file having a chunk file identifier of "2", and an entry that associates a chunk identifier of "SHA-$1_i$" with a chunk file having a chunk file identifier of "3".

FIG. 4E is a diagram illustrating a data structure in accordance with some embodiments. Data structure 440 may be stored by a storage system, such as storage system 112, in a metadata store, such as metadata store 114. In some embodiments, data structure 440 corresponds to a chunk metadata data structure.

The storage system may perform a post-processing metadata conversion process to remove entries of the chunk metadata data structure corresponding to data chunks that are referenced by less than a threshold number of objects. The storage system may determine the number of objects that reference a data chunk associated with an entry by traversing a data structure, such as data structure 400.

In the example shown, the entry that associates a chunk identifier of "SHA-$1_h$" with a chunk file having a chunk file identifier of "2" and the entry that associates a chunk identifier of "SHA-$1_i$" with a chunk file having a chunk file identifier of "3" were removed from data structure 430. As a result of performing a post-processing metadata conversion process, the amount of memory used to store the chunk metadata data structure is reduced because the chunk metadata data structure stores entries for deduplicated data chunks and not for all data chunks.

FIG. 4F is a diagram illustrating a data structure in accordance with some embodiments. Data structure 450 may be stored by a storage system, such as storage system 112, in a metadata store, such as metadata store 114. In some embodiments, data structure 450 corresponds to a chunk file metadata data structure.

Data structure 450 is a modified version of data structure 410. The amount of memory used to store metadata may be reduced for entries having chunk identifiers that are associated with fewer than a threshold number of other entries. For each of these entries, a chunk identifier associated with the entry is modified from a first chunk identifier to a second chunk identifier where the second chunk identifier uses fewer bytes to represent a data chunk. For example, the first chunk identifier may be an SHA-1 hash value, which is represented by a 20-byte value. The second chunk identifier may be an 8-byte value.

In the example shown, neither a first data chunk having a chunk identifier of "SHA-1$_g$" nor a second data chunk having the chunk identifier of "SHA-1$_i$" are associated with a threshold number of other entries (not shown in data structure 450). The storage system modified the chunk identifier of "SHA-1$_g$" to be "8-byte A", which is an 8-byte value that represents the first data chunk and the storage system modified the chunk identifier of "SHA-1$_i$" to be "8-byte B", which is an 8-byte value that represents the second data chunk. The amount of memory used to store data structure 410 has been reduced by 24 bytes.

FIG. 4G is a diagram illustrating a data structure in accordance with some embodiments. Data structure 460 may be stored by a storage system, such as storage system 112, in a metadata store, such as metadata store 114. Data structure 460 may correspond to a tree data structure.

Data structure 460 is a modified version of data structure 400. The amount of memory used to store metadata may be reduced for non-deduplicated data chunks. For each of these non-deduplicated data chunks, a corresponding chunk identifier is modified from a first chunk identifier to a second chunk identifier. For example, the first chunk identifier may be an SHA-1 hash value, which is represented by a 20-byte value. The second chunk identifier may be an 8-byte value.

During data ingestion, a leaf node of a tree data structure, such as data structure 400, is configured to store a chunk identifier (e.g., an SHA-1 hash value) that allows a data chunk associated with the chunk identifier to be located via a chunk metadata table and a chunk file metadata table. After performing a post-processing metadata conversion process, data structure 400 has been updated, as illustrated in data structure 460, to reduce the amount of memory needed to store chunk identifiers for non-deduplicated chunks.

In the example shown, neither a first data chunk having a chunk identifier of "SHA-1$_h$" nor a second data chunk having the chunk identifier of "SHA-1$_i$" are the same chunk identifier associated with more than a threshold number of other entries (not shown in data structure 450). The storage system modified the chunk identifier of "SHA-1$_h$" to be "8-byte A", which is an 8-byte value that represents the first data chunk and the storage system modified the chunk identifier of "SHA-1$_i$" to be "8-byte B", which is an 8-byte value that represents the second data chunk. The storage system subsequently updated the leaf node corresponding to the first data chunk to store the second chunk identifier of "8-byte A" instead of "SHA-1$_h$" and updated the leaf node corresponding to the second data chunk to store the second chunk identifier of "8-byte B" instead of "SHA-1$_i$". As a result, the amount of memory used to store data structure 400 has been reduced by 24 bytes.

The storage system has also updated the leaf node corresponding to the first data chunk to store a chunk file identifier of "2," which corresponds to the chunk file storing the first data chunk and updated the leaf node corresponding to the second data chunk to store a chunk identifier of "3," which corresponds to the chunk file storing the second data chunk. This enables the storage system to locate the data chunks without having to use the chunk metadata structure. As a result, the storage system may use less time and fewer resources to locate the data chunks.

Figure 5:
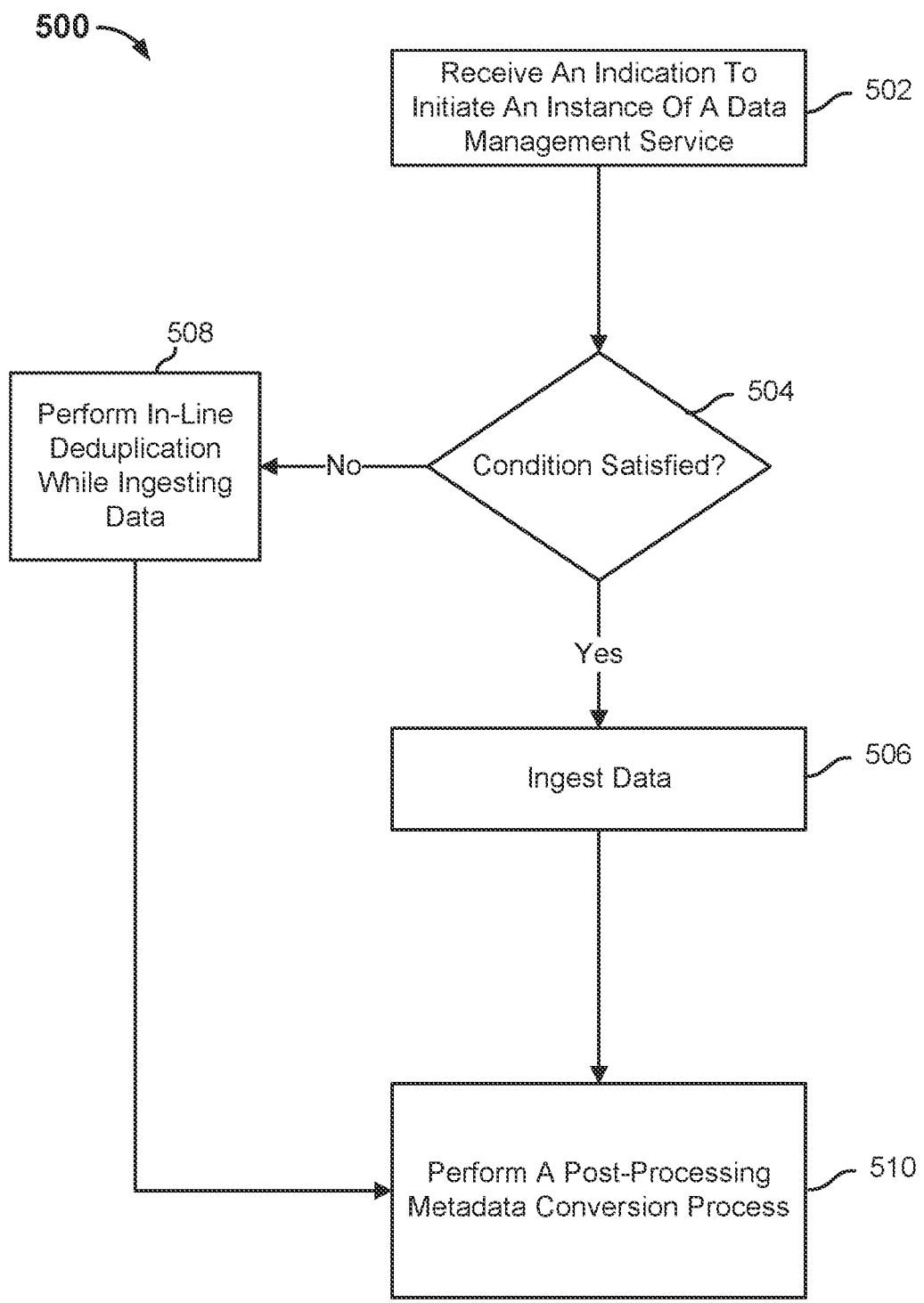
FIG. 5 is a flow diagram illustrating a process for reducing the amount of memory used to store metadata in accordance with some embodiments.

FIG. 5 is a flow diagram illustrating a process for reducing the amount of memory used to store metadata in accordance with some embodiments. In some embodiments, process 500 is implemented by a storage system, such as storage system 112.

At 502, an indication to initiate a data management operation is received. The data management operation may be a backup of a source system, a replication of a source system, a tiering of one or more objects stored on the source system to a storage system, a migration of data from the source system to the storage system, etc.

In some embodiments, the indication is received from the source system. In some embodiments, the indication is received from a client device associated with the source system. In some embodiments, the data management operation is initiated by the storage system.

At 504, it is determined whether one or more conditions are satisfied. In some embodiments, a condition is satisfied in the event the total amount of data to be ingested by the storage system during a performance of the data management operation is greater than a threshold amount of data. In some embodiments, a condition is satisfied in the event CPU usage of the storage system during data ingestion exceeds a threshold CPU usage. In some embodiments, a condition is satisfied in the event the storage system is unable to meet a service level agreement by performing in-line deduplication. In some embodiments, a condition is satisfied in the event a user associated with a source system selects to ingest data without performing in-line deduplication.

In the event a condition is satisfied, process 500 proceeds to 506. In the event a condition is not satisfied, process 500 proceeds to 508.

At 506, data is ingested. In some embodiments, the storage system ingests data from a source system and chunks the ingested data into a plurality of data chunks. The plurality of data chunks are variable sized data chunks. For each of the data chunks, the storage system generates a corresponding chunk identifier (e.g., SHA-1 hash value), stores the data chunk in a corresponding chunk file, updates a chunk file metadata data structure to associate the corresponding chunk identifier with the corresponding chunk file and to indicate that the corresponding chunk file needs to undergo a post-processing metadata conversion process, and updates a node of a tree data structure to store a reference to the corresponding chunk file storing the data chunk.

In some embodiments, the source system provides a plurality of data chunks and corresponding chunk identifiers to the storage system. For each of the data chunks, the storage system stores the data chunk in a corresponding chunk file, updates a chunk file metadata data structure to associate the corresponding chunk identifier with the corresponding chunk file and to indicate that the corresponding chunk file needs to undergo a post-processing metadata conversion process, and updates a node of a tree data structure to store a reference to the corresponding chunk file storing the data chunk.

The storage system maintains a chunk file metadata data structure that is comprised of a plurality of entries. An entry corresponds to a chunk file and associates a chunk file identifier associated with the chunk file with one or more chunk identifiers. This indicates the one or more data chunks having the one or more chunk identifiers that are stored in the chunk file.

At 508, in-line deduplication is performed while data is being ingested. The storage system maintains in a metadata store a chunk metadata data structure (e.g., a table) that indicates the data chunks that are already stored by the storage system. The storage system is configured to write a batch of data chunks to a storage device. Prior to writing the batch of data chunks, the storage system determines whether any of the data chunks included in the batch are already stored by the storage system by comparing a corresponding chunk identifier associated with each of the data chunks included in the batch to the plurality of chunk identifiers stored by the chunk metadata data structure.

In the event a data chunk included in the batch is already stored by the storage system (either prior to performing the data management operation or from a previous batch included in a performance of the data management operation), the storage system deletes the data chunk from memory and stores a reference to the already stored data chunk.

In the event a data chunk included in the batch is not already stored by the storage system, the storage system writes the data chunk to a chunk file, updates the chunk metadata data structure to include an entry that associates the chunk identifier associated with the data chunk with a chunk file identifier associated with the chunk file storing the data chunk, updates a chunk file metadata data structure to associate the chunk file identifier with the chunk file storing the data chunk, and generates a node of a tree data structure corresponding to the data chunk to store the chunk identifier associated with the data chunk.

At 510, a post-processing metadata conversion process is performed. In some embodiments, the storage system periodically (e.g., daily, weekly, monthly, etc.) performs the post-processing metadata conversion process. The storage system may perform one or more data management operations before the post-processing metadata conversion process is performed. In some embodiments, the storage system performs the post-processing metadata conversion process when the storage system has resources to perform it as a background process.

In some embodiments, the storage system ingested data from a source system without performing in-line deduplication. The storage system determines duplicate data chunks, deduplicates the data chunks, and updates metadata stored in a memory of the storage system. A chunk metadata data structure is updated to include a corresponding entry for each of the deduplicated data chunks. This reduces the amount of memory used by a memory of the storage system to store metadata because instead of storing an entry for every data chunk stored by the storage system in the chunk metadata data structure, the chunk metadata data structure stores entries for deduplicated data chunks. The amount of memory savings can be significant when the storage system stores a single copy of a data chunk for a large number of data chunks.

The amount of memory used to store metadata may be further reduced by modifying the chunk identifier associated with a non-deduplicated data chunk from a first chunk identifier (e.g., SHA-1 hash value) to a second chunk identifier (e.g., 8 byte value) where the second chunk identifier uses fewer bytes to represent a data chunk. Data structures that reference the first chunk identifier are modified to reference the second chunk identifier instead of the first chunk identifier. This also reduces the amount of memory used to store metadata because the amount of memory used to store chunk identifiers associated with non-deduplicated data chunks is reduced.

In some embodiments, the storage system performed in-line deduplication while ingesting data from a source system. As a result of performing step 508, the chunk metadata data structure may store an entry for a data chunk that is referenced by fewer than a threshold number of objects. A threshold period of time (e.g., 2 months) may have passed since in-line deduplication was performed. In the event the storage system stores a single copy of the data chunk after the threshold period of time has passed, this may indicate that the storage system is unlikely to store an additional copy of the data chunk. The storage system identifies entries of the chunk metadata data structure that are associated with data chunks that are not referenced by a threshold number of objects (e.g., two or more). For each of the identified entries, the storage system removes the entry from the chunk metadata data structure and updates a node of a tree data structure corresponding to the data chunk to store a reference to the corresponding chunk file storing the data chunk. The reference enables the storage system to locate the data chunk without having to utilize the chunk metadata data structure when the storage system receives a request for an object storing the data chunk. This reduces the amount of memory used to store the chunk file metadata data structure by removing entries that correspond to data chunks that are not referenced by a threshold number of objects.

The amount of memory used to store metadata may be further reduced by modifying the chunk identifier associated with an entry that is removed from the chunk metadata data structure from a first chunk identifier (e.g., SHA-1 hash value) to a second chunk identifier (e.g., 8 byte value) where the second chunk identifier uses fewer bytes to represent a data chunk. Data structures that reference the first chunk identifier are modified to reference the second chunk identifier instead of the first chunk identifier. This also reduces the amount of memory used to store metadata because the amount of memory used to store chunk identifiers associated with non-deduplicated data chunks is reduced.

Figure 6A:
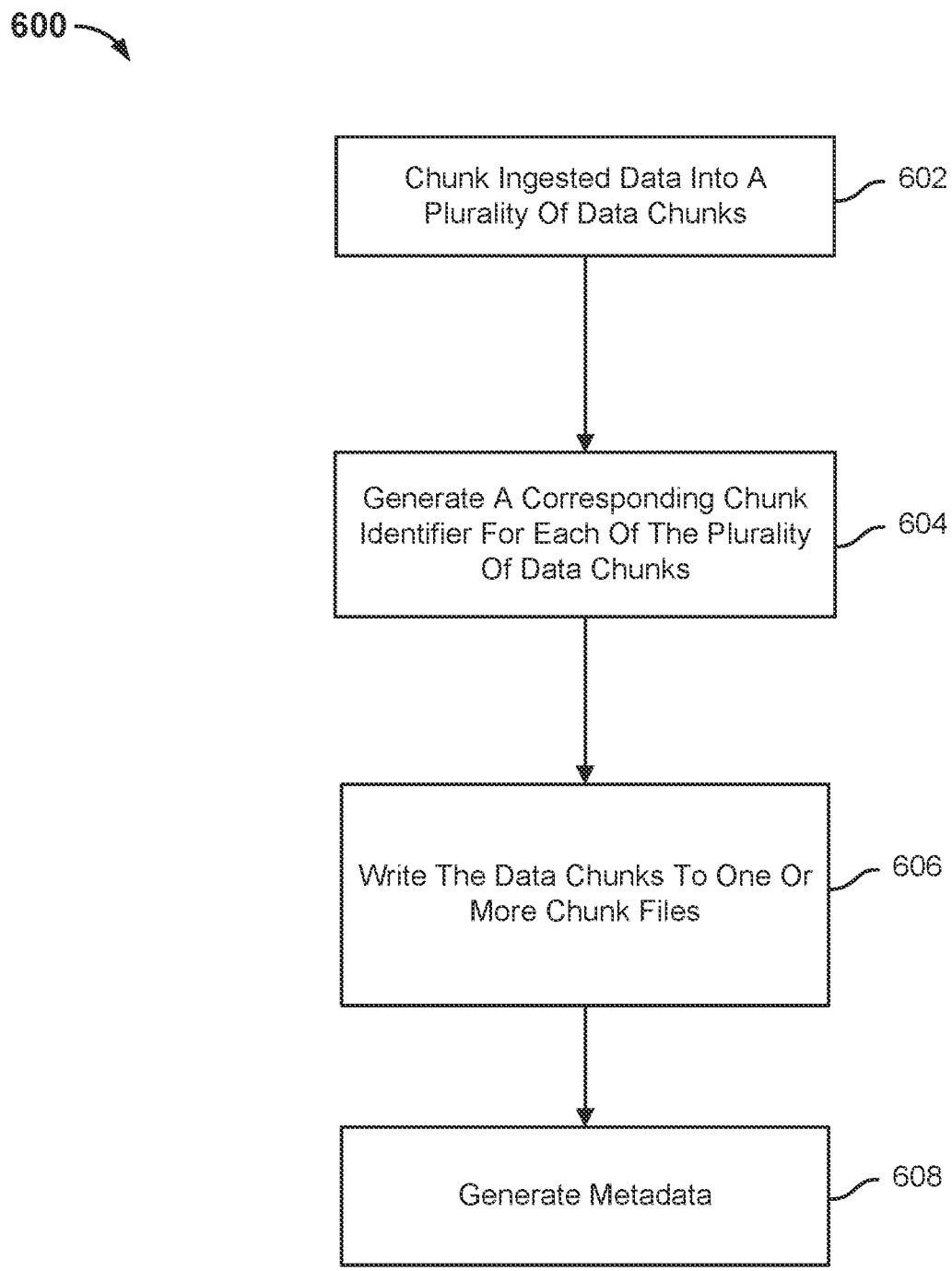
FIG. 6A is a flow diagram illustrating a process for ingesting data in accordance with some embodiments.

FIG. 6A is a flow diagram illustrating a process for ingesting data in accordance with some embodiments. In some embodiments, process 600 may be implemented by a storage system, such as storage system 112. In some embodiments, process 600 is implemented to perform some or all of step 506 of process 500.

At 602, ingested data is chunked into a plurality of data chunks. The plurality of data chunks are variable sized data chunks.

At 604, a corresponding chunk identifier is generated for each of the plurality of data chunks. A cryptographic hash algorithm may be applied to the plurality of data chunks to generate a corresponding hash value (e.g., SHA-1 hash value, SHA-2 hash value, etc.) for each of the plurality of data chunks.

At 606, the plurality of data chunks are written to one or more chunk files stored by the storage system. In some embodiments, one or more data chunks are written to an existing chunk file. In some embodiments, a new chunk file is generated and one or more data chunks are written to the new chunk file.

At 608, metadata that enables the plurality of data chunks to be located is generated.

The storage system stores a chunk file metadata data structure that includes a plurality of entries. Each entry corresponds to a chunk file and associates a chunk file identifier associated with the chunk file with one or more chunk identifiers corresponding to one or more data chunks stored in the chunk file. Metadata is generated in the chunk file metadata data structure for the plurality of data chunks. The metadata associated with an entry is updated to indicate that the chunk file needs to undergo a post-processing metadata conversion process when a data chunk is written to the chunk file.

In some embodiments, an entry corresponding to a new chunk file is added to the chunk file metadata data structure and the entry includes the one or more chunk identifiers associated with the one or more data chunks that are stored in the new chunk file. In some embodiments, an entry corresponding to an existing chunk file is updated to include the one or more chunk identifiers associated with the one or more data chunks that are stored in the existing chunk file.

During data ingestion, the storage system generates a tree data structure that enables the plurality of data chunks to be located. The tree data structure includes a plurality of nodes that are associated with corresponding data bricks. A data brick is associated with one or more data chunks. For each of the one or more data chunks associated with a data brick, the data brick is configured to store information that associates an object offset for the data chunk with an extent for the data chunk and a chunk file identifier corresponding to a chunk file storing the data chunk. For example, a first data brick may indicate that a first data chunk having a chunk identifier of C1 is associated with an object offset of 0 MB-1 MB and has a data chunk size of 1 MB, a second data brick may indicate that a second data chunk having a chunk identifier of C2 is associated with an object offset of 1 MB-2 MB and has a data chunk size of 1 MB, . . . , and an eighth data brick may indicate that an eighth data chunk identifier of C8 is associated with an object offset of 7 MB-8 MB and has a data chunk size of 1 MB.

Figure 6B:
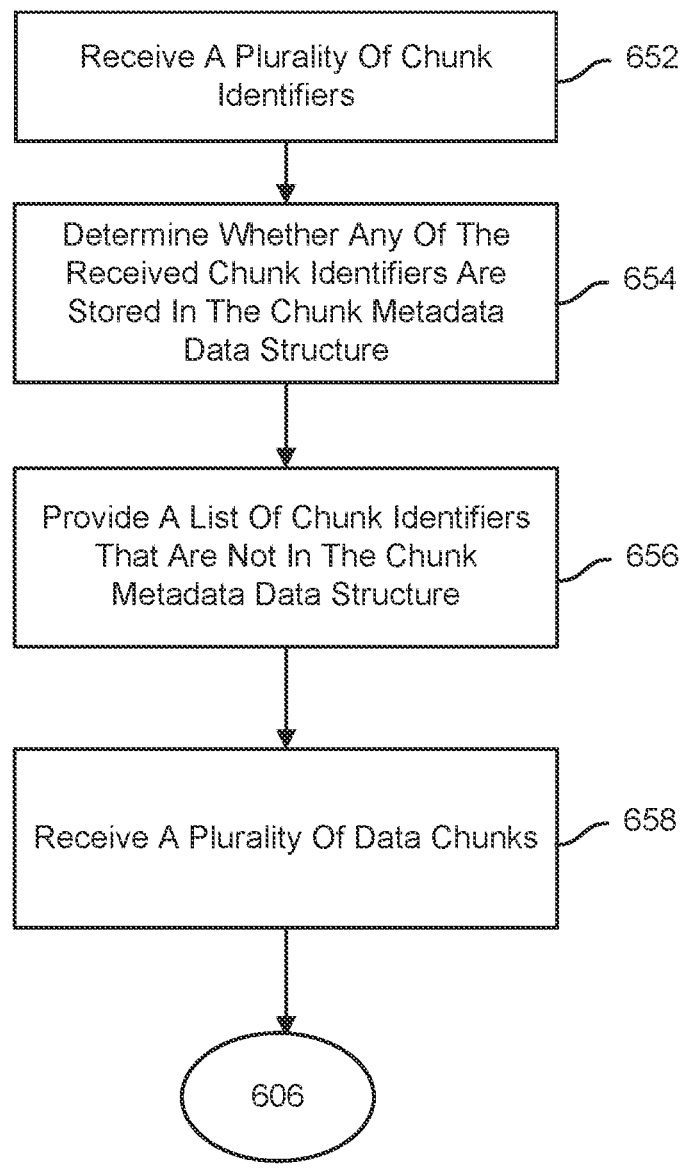
FIG. 6B is a flow diagram illustrating a process for ingesting data in accordance with some embodiments.

FIG. 6B is a flow diagram illustrating a process for ingesting data in accordance with some embodiments. In some embodiments, process 650 may be implemented by a storage system, such as storage system 112. In some embodiments, process 650 is implemented to perform some or all of step 506 of process 500.

At 652, a plurality of chunk identifiers are received from a source system. At 654, it is determined whether any of the received chunk identifiers are stored in a chunk metadata data structure. At 656, a list of chunk identifiers that are not in the chunk metadata data structure is provided to the source system. At 658, a plurality of data chunks corresponding to the chunk identifiers included in the list are received.

Figure 7A:
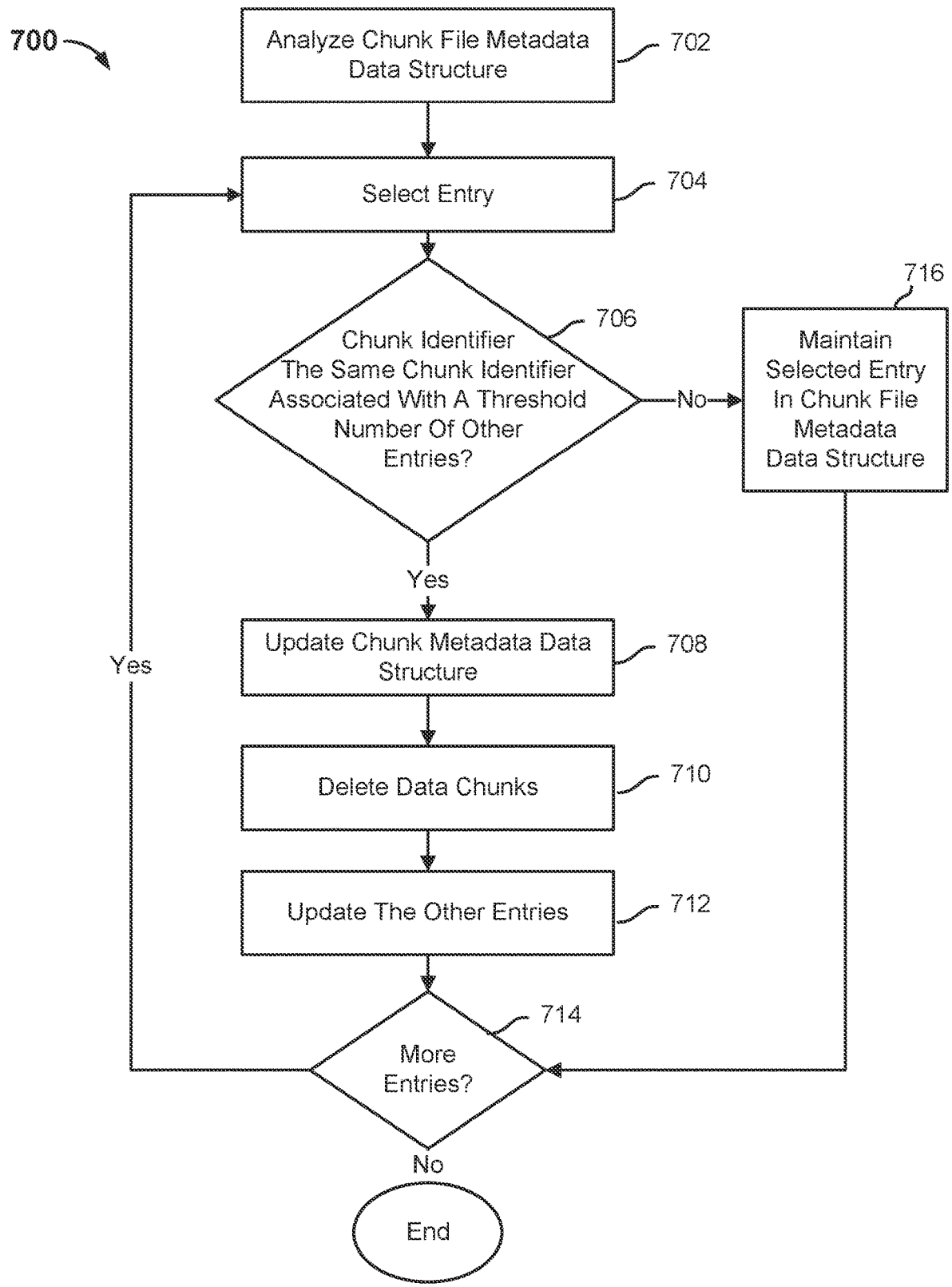
FIG. 7A is a flow diagram illustrating a process for performing a post-processing metadata conversion process in accordance with some embodiments.

FIG. 7A is a flow diagram illustrating a process for performing a post-processing metadata conversion process in accordance with some embodiments. In some embodiments, process 700 may be implemented by a storage system, such as storage system 112. In some embodiments, process 700 is implemented to perform some or all of step 510 of process 500. Performing process 700 may result in the chunk metadata data structure storing entries for deduplicated data chunks. This may reduce the amount of memory used to store metadata because the chunk metadata data structure stores entries for deduplicated data chunks instead of storing entries for all data chunks.

At 702, a chunk file metadata data structure is analyzed. When data is ingested into a storage system, data chunks are written to one or more chunk files. The chunk file metadata data structure includes an entry for each of the chunk files stored by the storage system. An entry of the chunk file metadata data structure associates a chunk file identifier associated with a chunk file with one or more chunk identifiers associated with data chunks stored in the chunk file. The metadata associated with an entry is updated to indicate that the chunk file corresponding to the entry needs to undergo post-processing when a data chunk is written to the chunk file corresponding to the entry. The storage system determines one or more entries that indicate a chunk file corresponding to the entry needs to undergo a post-processing metadata conversion process.

At 704, an entry of the determined one or more entries is selected.

At 706, it is determined whether a chunk identifier associated with the selected entry is the same chunk identifier associated with a threshold number of other entries (e.g., one or two). In the event it is determined that the chunk identifier associated with the selected entry is the same chunk identifier associated with a threshold number of other entries, process 700 proceeds to 708. In the event it is determined that the chunk identifier associated with the selected entry is not the same chunk identifier associated with a threshold number of other entries, process 700 proceeds to 716. For example, the selected entry may be the only entry of the chunk file metadata data structure that includes the chunk identifier.

At 708, a chunk metadata data structure is updated to include an entry that associates the chunk identifier associated with the selected entry with the chunk file identifier associated with the selected entry.

At 710, a data chunk corresponding to the same chunk identifier is deleted from each of the chunk files corresponding to the one or more other entries.

At 712, the one or more other entries are updated to unreference the deleted data chunk.

At 714, it is determined whether there are more entries in the chunk file metadata data structure to analyze. In the event there are more entries in the chunk metadata file data structure to analyze, process 700 returns to 704. In the event there are no remaining entries in the chunk file metadata data structure to analyze, process 700 ends.

At 716, the selected entry is maintained in the chunk file metadata structure.

Figure 7B:
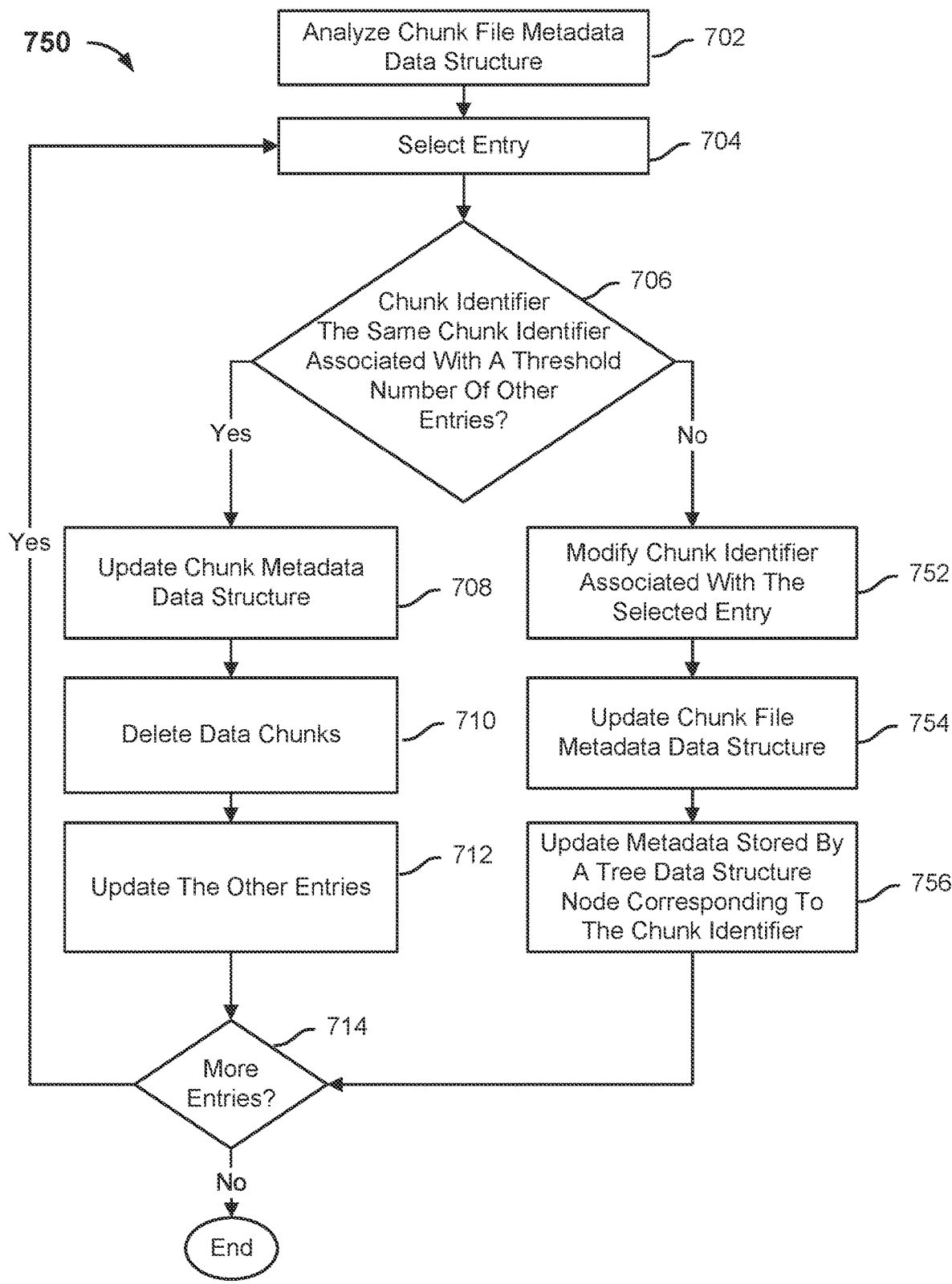
FIG. 7B is a flow diagram illustrating a process for performing a post-processing metadata conversion process in accordance with some embodiments.

FIG. 7B is a flow diagram illustrating a process for performing a post-processing metadata conversion process in accordance with some embodiments. In some embodiments, process 750 may be implemented by a storage system, such as storage system 112. In some embodiments, process 750 is implemented to perform some or all of step 506 of process 500. Process 750 is similar to process 700 except for step 716 of process 700 has been replaced with steps 752, 754, and 756. Performing process 750 results in a further reduction in the amount of memory used to store metadata.

At 752, a chunk identifier associated with the selected entry is modified. The chunk identifier associated with the selected entry is modified from a first chunk identifier to a second chunk identifier where the second chunk identifier is a value that uses fewer bytes to represent a data chunk. For example, the first chunk identifier may be an SHA-1 hash value, which is represented by a 20-byte value. The second chunk identifier may be an 8-byte value.

At 754, a chunk file metadata data structure is updated. The selected entry is updated to store the second chunk identifier in place of the first chunk identifier.

At 756, metadata stored by a tree data structure node corresponding to the chunk identifier is updated. A node of a tree data structure storing a reference to the chunk identifier associated with the selected entry is updated to reference the second chunk identifier instead of the first chunk identifier.

Figure 8A:
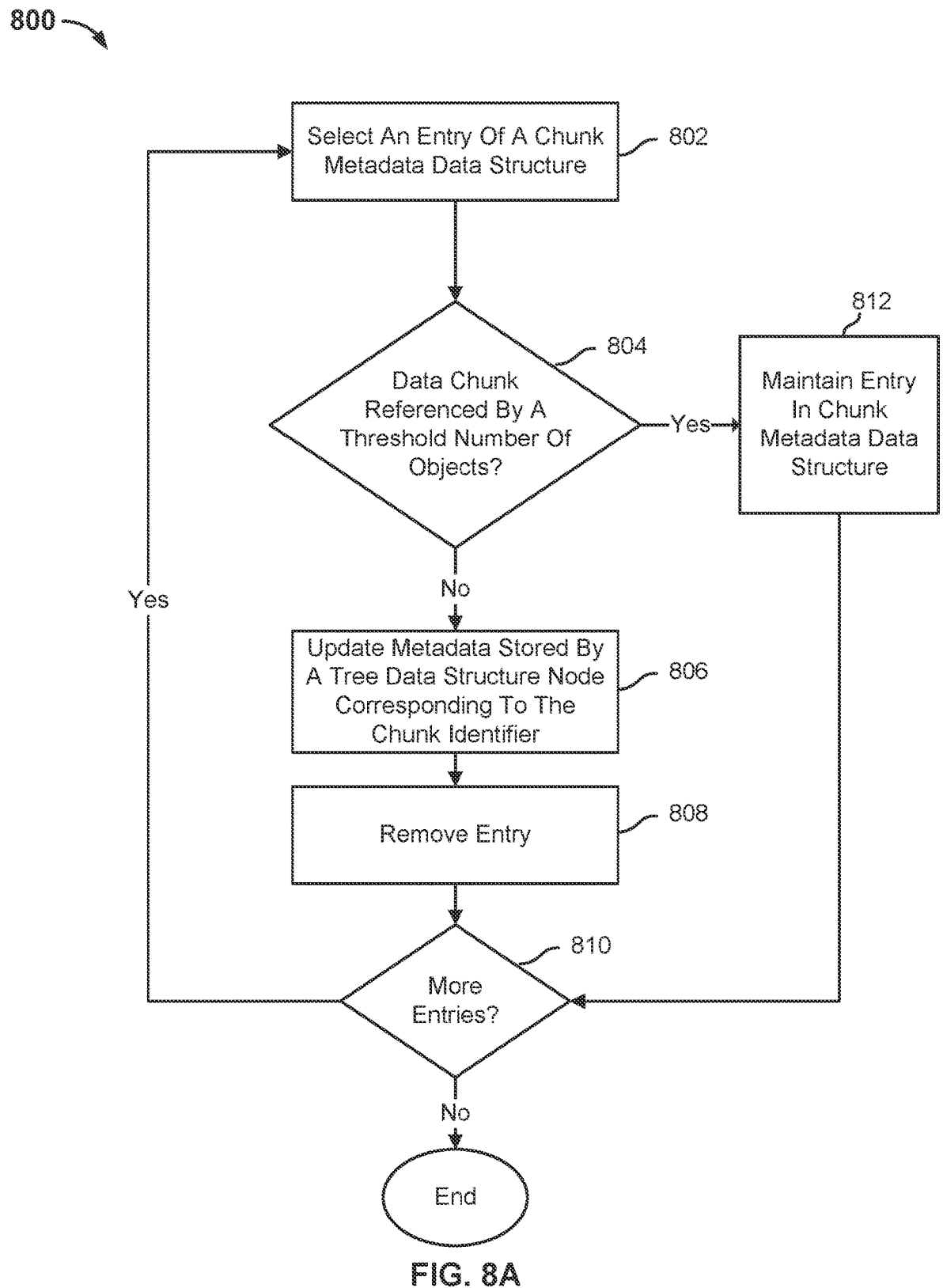
FIG. 8A is a flow diagram illustrating a process for performing a post-processing metadata conversion process in accordance with some embodiments.

FIG. 8A is a flow diagram illustrating a process for performing a post-processing metadata conversion process in accordance with some embodiments. In some embodiments, process 800 may be implemented by a storage system, such as storage system 112. In some embodiments, process 800 is implemented to perform some or all of step 510 of process 500.

At 802, an entry of a chunk metadata data structure is selected. Each entry of the chunk metadata data structure associates a chunk identifier associated with a data chunk with a chunk file identifier associated with a chunk file storing the data chunk.

At 804, it is determined whether a data chunk corresponding to the chunk identifier associated with the selected entry is referenced by a threshold number of objects. The storage system may determine the number of objects that reference a data chunk associated with an entry by traversing one or more tree data structures as described herein. In the event the data chunk corresponding to the chunk identifier associated with the selected entry is referenced by a threshold number of objects (e.g., two or more), process 800 proceeds to step 812 where the selected entry is maintained in the chunk metadata data structure. In the event the data chunk corresponding to the chunk identifier associated with the selected entry is not referenced by a threshold number of objects, (e.g., the data chunk is referenced by a single object), process 800 proceeds to 806.

At 806, metadata stored by a tree data structure node corresponding to the chunk identifier is updated to store a reference to the corresponding chunk file storing the data chunk. The reference enables the storage system to locate the data chunk without having to utilize the chunk metadata data structure when the storage system receives a request for an object storing the data chunk. For example, the reference may be the chunk file identifier associated with the chunk file.

At 808, the selected entry is removed from the chunk metadata data structure.

At 810, it is determined whether there are more entries in the chunk metadata data structure to analyze. In the event there are more entries in the chunk metadata data structure to analyze, process 800 returns to 802. In the event there are no remaining entries in the chunk metadata data structure to analyze, process 800 ends.

Figure 8B:
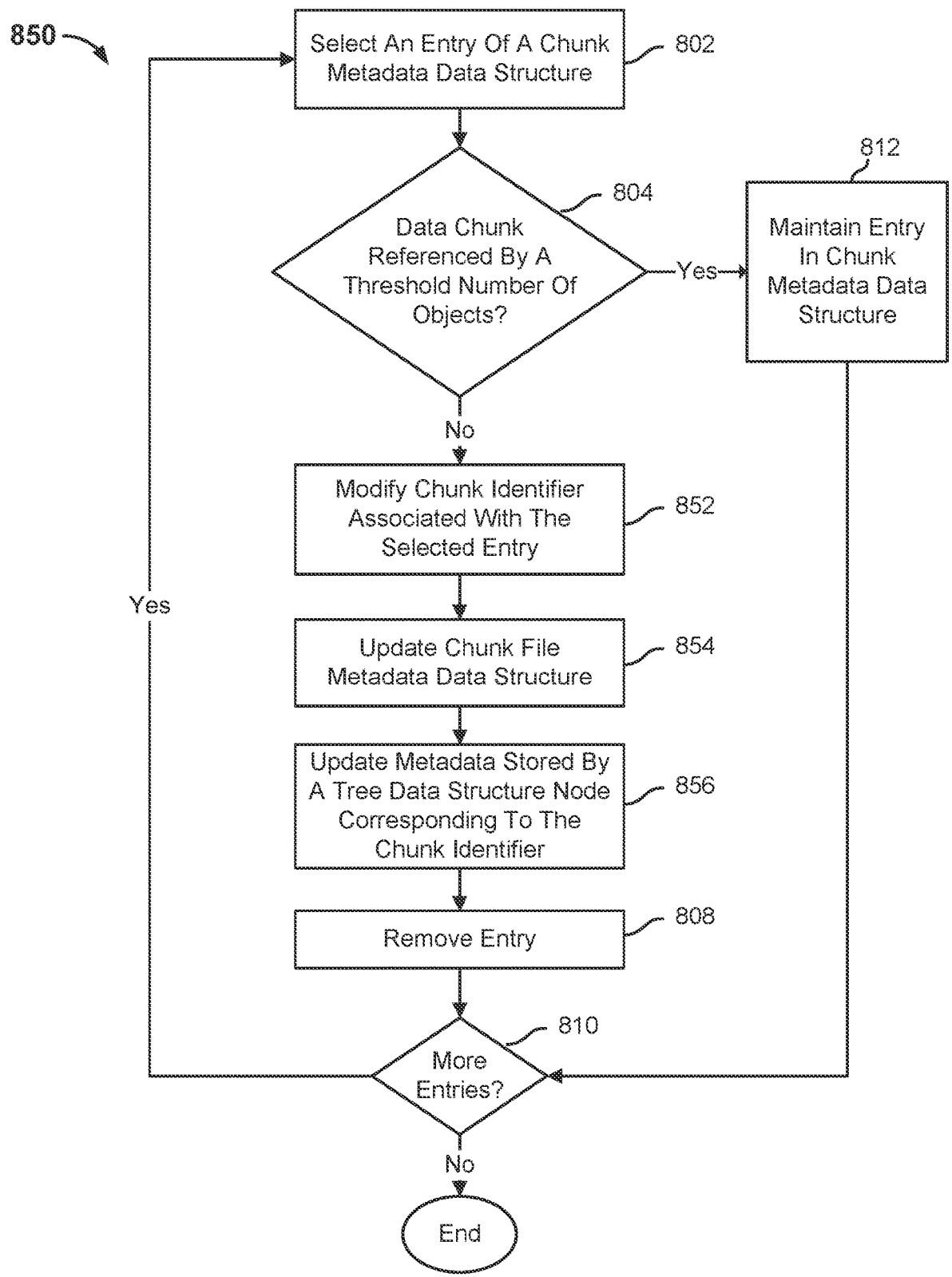
FIG. 8B is a flow diagram illustrating a process for performing a post-processing metadata conversion process in accordance with some embodiments.

FIG. 8B is a flow diagram illustrating a process for performing a post-processing metadata conversion process in accordance with some embodiments. In some embodiments, process 850 may be implemented by a storage system, such as storage system 112. In some embodiments, process 850 is implemented to perform some or all of step 510 of process 500. Process 850 is similar to process 800 except for step 806 has been replaced with step 856 and steps 852 and 854 have been added. Performing process 850 results in a further reduction in the amount of memory used to store metadata.

At 852, a chunk identifier associated with the selected entry is modified. The chunk identifier associated with the selected entry is modified from a first chunk identifier to a second chunk identifier where the second chunk identifier is a value that uses fewer bytes to represent a data chunk. For example, the first chunk identifier may be an SHA-1 hash value, which is represented by a 20-byte value. The second chunk identifier may be an 8-byte value.

At 854, a chunk file metadata data structure is updated. An entry of the chunk file metadata data structure storing the first chunk identifier is updated to store the second chunk identifier in place of the first chunk identifier.

At 856, metadata stored by a tree data structure node corresponding to the chunk identifier is updated to store a reference to the corresponding chunk file storing the data chunk. The reference enables the storage system to locate the data chunk without having to utilize the chunk metadata data structure when the storage system receives a request for an object storing the data chunk. For example, the reference may be the chunk file identifier associated with the chunk file.

Metadata stored by a tree data structure node corresponding to the chunk identifier is further updated to store the second chunk identifier in place of the first chunk identifier.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

ingesting data from a source system including by storing a plurality of data chunks in one or more chunk files and storing corresponding chunk identifiers associated with the plurality of data chunks in a first data structure, wherein the first data structure includes a first plurality of entries that includes a first entry, wherein the first entry of the first data structure corresponds to a first chunk file of the one or more chunk files and associates a chunk file identifier of the first chunk file with a first set of one or more chunk identifiers associated with a first set of one or more data chunks stored in the first chunk file, wherein the first entry includes a corresponding offset for the first set of one or more chunk identifiers within the first chunk file; and after data ingestion is complete, determining one or more duplicate data chunks that were stored during the data ingestion and updating a second data structure to include one or more entries corresponding to the one or more determined duplicate data chunks, wherein the second data structure is comprised of a second plurality of entries, wherein each of the second plurality of entries associates a corresponding chunk identifier of a stored data chunk with a corresponding chunk file identifier of a chunk file storing the stored data chunk, wherein determining the one or more duplicate data chunks that were stored during the data ingestion includes identifying a threshold number of entries associated with the first data structure that include a first chunk identifier included in the first set of one or more chunk identifiers and updating the second data structure to include a new entry that associates the first chunk identifier corresponding to a first data chunk with the first chunk file storing the first data chunk.

2. The method of claim 1, wherein the plurality of data chunks are variable sized data chunks.

3. The method of claim 1, wherein the first data structure and the second data structure are stored in a memory of a storage system.

4. The method of claim 1, wherein ingesting the data from the source system includes generating a tree data structure that enables the plurality of data chunks to be located.

5. The method of claim 1, wherein ingesting the data from the source system includes generating the corresponding chunk identifiers for each of the plurality of data chunks.

6. The method of claim 1, wherein determining the one or more duplicate data chunks that were stored during the data ingestion includes:
selecting the first entry of the first data structure; and
determining whether the first chunk identifier associated with the first entry is a same chunk identifier associated with a threshold number of other entries of the first data structure.

7. The method of claim 6, wherein determining the one or more duplicate data chunks that were stored during the data ingestion further includes updating the second data structure to include the first entry that associates the first chunk identifier corresponding to the first data chunk with the first chunk file storing the first data chunk in response to determining that the first chunk identifier associated with the first entry is the same chunk identifier associated with the threshold number of other entries of the first data structure.

8. The method of claim 7, further comprising deleting the first data chunk corresponding to the first chunk identifier associated with the first entry from one or more chunk files corresponding to the threshold number of other entries.

9. The method of claim 8, further comprising updating the other entries to unreference the first chunk identifier associated with the first data chunk.

10. The method of claim 1, wherein determining the one or more duplicate data chunks that were stored during the data ingestion includes:
selecting a second entry of the first data structure; and
determining whether a corresponding chunk identifier associated with the selected second entry is a same chunk identifier associated with a threshold number of other entries of the first data structure.

11. The method of claim 10, wherein determining the one or more duplicate data chunks that were stored during the data ingestion further includes modifying the chunk identifier associated with the selected second entry of the first data structure to be a different chunk identifier in response to determining that the chunk identifier associated with the selected second entry of the first data structure is not the same chunk identifier associated with the threshold number of other entries of the first data structure.

12. The method of claim 11, further comprising updating the selected second entry of the first data structure to reference the different chunk identifier in place of the chunk identifier associated with the selected second entry of the first data structure.

13. The method of claim 12, further comprising updating a node of a tree data structure that references the chunk identifier associated with the selected second entry to reference the different chunk identifier.

14. A computer program product embodied in a non-transitory computer readable medium and comprising computer instructions for:
ingesting data from a source system including by storing a plurality of data chunks in one or more chunk files and storing corresponding chunk identifiers associated with the plurality of data chunks in a first data structure, wherein the first data structure includes a first plurality of entries that includes a first entry, wherein the first entry of the first data structure corresponds to a first chunk file of the one or more chunk files and associates a chunk file identifier of the first chunk file with a first set of one or more chunk identifiers associated with a first set of one or more data chunks stored in the first chunk file, wherein the first entry includes a corresponding offset for the first set of one or more chunk identifiers within the first chunk file; and
after data ingestion is complete, determining one or more duplicate data chunks that were stored during the data ingestion and updating a second data structure to include one or more entries corresponding to the one or more determined duplicate data chunks, wherein the second data structure is comprised of a second plurality of entries, wherein each of the second plurality of entries associates a corresponding chunk identifier of a stored data chunk with a corresponding chunk file identifier of a chunk file storing the stored data chunk, wherein determining the one or more duplicate data chunks that were stored during the data ingestion includes identifying a threshold number of entries associated with the first data structure that include a first chunk identifier included in the first set of one or more chunk identifiers and updating the second data structure to include a new entry that associates the first chunk identifier corresponding to a first data chunk with the first chunk file storing the first data chunk.

15. The computer program product of claim 14, wherein the plurality of data chunks are variable sized data chunks.

16. A system, comprising:
one or more processors configured to:
ingest data from a source system including by storing a plurality of data chunks in one or more chunk files and storing corresponding chunk identifiers associated with the plurality of data chunks in a first data structure, wherein the first data structure includes a first plurality of entries that includes a first entry, wherein the first entry of the first data structure corresponds to a first chunk file of the one or more chunk files and associates a chunk file identifier of the first chunk file with a first set of one or more chunk identifiers associated with a first set of one or more data chunks stored in the first chunk file, wherein the first entry includes a corresponding offset for the first set of one or more chunk identifiers within the first chunk file; and after data ingestion is complete, determine one or more duplicate data chunks that were stored during the data ingestion and update a second data structure to include one or more entries corresponding to the one or more determined duplicate data chunks, wherein the second data structure is comprised of a second plurality of entries, wherein each of the second plurality of entries associates a corresponding chunk identifier of a stored data chunk with a corresponding chunk file identifier of a chunk file storing the stored data chunk, wherein determining the one or more duplicate data chunks that were stored during the data ingestion includes identifying a threshold number of entries associated with the first data structure that include a first chunk identifier included in the first set of one or more chunk identifiers and updating the second data structure to include a new entry that associates the first chunk identifier corresponding to a first data chunk with the first chunk file storing the first data chunk; and a memory coupled to the one or more processors and configured to provide the one or more processors with instructions.

\* \* \* \* \*